US012404701B2

(12) United States Patent
Seykora et al.

(10) Patent No.: US 12,404,701 B2
(45) Date of Patent: Sep. 2, 2025

(54) GATE FASTENING DEVICE

(71) Applicant: Outerpull LLC, Portland, OR (US)

(72) Inventors: Andrew William Seykora, Portland, OR (US); Oren Simon Bernstein, Portland, OR (US)

(73) Assignee: Outerpull LLC, Portland, OR (US)

( * ) Notice: Subject to any disclaimer, the term of this patent is extended or adjusted under 35 U.S.C. 154(b) by 73 days.

(21) Appl. No.: 17/883,579

(22) Filed: Aug. 8, 2022

(65) Prior Publication Data

US 2023/0074741 A1 Mar. 9, 2023

Related U.S. Application Data

(60) Provisional application No. 63/230,664, filed on Aug. 6, 2021.

(51) Int. Cl.
*E05B 65/00* (2006.01)
*E05C 1/12* (2006.01)

(52) U.S. Cl.
CPC ............ *E05B 65/0007* (2013.01); *E05C 1/12* (2013.01); *E05Y 2900/40* (2013.01)

(58) Field of Classification Search
CPC ..... E05B 65/0007; E05C 1/12; E05Y 2900/40
See application file for complete search history.

(56) References Cited

U.S. PATENT DOCUMENTS

| | | | | |
|---|---|---|---|---|
| 4,932,693 | A * | 6/1990 | Schwartz | E05F 1/1215 292/228 |
| 6,931,897 | B2 * | 8/2005 | Talpe | E05B 65/0841 70/210 |
| 7,044,511 | B2 | 5/2006 | Kliefoth | |
| 7,201,030 | B2 * | 4/2007 | Timothy | E05B 65/0007 70/135 |
| 7,441,428 | B2 * | 10/2008 | Chang | E05B 65/0025 70/210 |
| 8,256,806 | B2 * | 9/2012 | Timothy | E05B 15/025 292/341.15 |
| 8,646,815 | B2 * | 2/2014 | Timothy | E05C 3/30 292/69 |
| 9,631,406 | B2 * | 4/2017 | Chartier | E05B 65/0007 |
| 9,803,396 | B2 * | 10/2017 | Timothy | E05B 65/0007 |
| 10,006,231 | B2 * | 6/2018 | Grommet | E05C 3/08 |
| 10,081,966 | B2 * | 9/2018 | Cheng | E05B 17/0008 |
| 2005/0184532 | A1 * | 8/2005 | Karcz | E05B 63/20 292/163 |
| 2005/0225098 | A1 * | 10/2005 | Kliefoth | E05C 19/163 292/251.5 |
| 2008/0296915 | A1 * | 12/2008 | Clark | E05C 19/163 292/251.5 |

* cited by examiner

*Primary Examiner* — Mark A Williams
(74) *Attorney, Agent, or Firm* — Psi Star Intellectual Property LLC

(57) ABSTRACT

Gate fastening devices and methods of installing the gate fastening devices.

21 Claims, 25 Drawing Sheets

GATE FASTENING DEVICE

CROSS-REFERENCE TO RELATED APPLICATION

This application is based upon and claims the benefit under 35 U.S.C. § 119(e) of U.S. Provisional Patent Application Ser. No. 63/230,664, filed Aug. 6, 2021, which is incorporated herein by reference in its entirety for all purposes.

INTRODUCTION

A gate is a barrier that is movable from a closed position to an open position to permit ingress into and egress from a space partially or wholly enclosed by walls. In residential applications, the gate is commonly hinged to an outdoor fence or other fixed barrier, and swings open and shut about a vertical axis. The hinged gate is typically held shut using a gate fastening device including a latch. The gate fastening device may be designed to allow manipulation of the latch using either of a pair of handles located on opposite sides of the gate. Although gate fastening devices with such a pair of handles are known, none is sufficiently versatile, modular, and customizable to accommodate a variety of different gates, hinge configurations, and user needs/preferences. A new gate fastening device is need.

SUMMARY

The present disclosure provides gate fastening devices and methods of installing the gate fastening devices.

In some examples, a gate fastening device may comprise a latching assembly including a latch pivotably coupled to a first support that mounts on a gate. The gate fastening device also may comprise an opposing assembly including a pivotable member coupled to a second support that mounts on the gate opposite the first support. The gate fastening device further may comprise a spindle, a handle, and/or a cover. The spindle may be configured to couple the latch and the pivotable member to one another through the gate for rotation as a unit. The handle also may include a base and a grip, with the base being attached, or configured to be attached, to the latch. The cover may be configured to be placed onto the first support and around the base of the handle.

In some examples, a gate fastening device may comprise a latching assembly having a front side opposite a back side and including a latch pivotably coupled to a support. The latching assembly may be configured to be operatively mountable on a left-hinged gate with the front side of the latching assembly facing the left-hinged gate and operatively mountable on a right-hinged gate with the back side of the latching assembly facing the right-hinged gate. The gate fastening device also may comprise a pair of handles each configured to be operatively coupled to the latch and respectively located on opposite sides of the left-hinged gate or the right-hinged gate. One of the handles may be configured to be mounted onto the back side of the latching assembly for the left-hinged gate and onto the front side of the latching assembly for the right-hinged gate.

In some examples, a method of installing a gate fastening device may comprise mounting a latching assembly on the gate. The latching assembly may include a latch pivotably coupled to a first support. An opposing assembly may be mounted on the gate opposite the first support. The opposing assembly may include a pivotable member coupled to a second support. The latch and the pivotable member may be coupled to one another through the gate for rotation as a unit. A base of a handle may be attached to the latch. A cover may be placed onto the first support and around the base of the handle.

In some examples, a method of installing a gate fastening device may be performed with a latching assembly having a front side opposite a back side and including a latch pivotably coupled to a support. The gate fastening device may be mounted such that the front side of the latching assembly faces the gate if the gate is left-hinged and such that the back side of the latching assembly faces the gate if the gate is right-hinged. A handle may be mounted to the latch on the back side of the latching assembly if the gate is left-hinged or on the front side of the latching assembly if the gate is right-hinged.

In some examples, components of the gate fastening device may be formed of different materials, such as a noncompliant (e.g., metal) spindle, latch, and cover, and a compliant (e.g., plastic) support. These choices, together with features like tapered counterbores, may facilitate securement of the device to a gate and securement of the cover to the support, among others.

Features, functions, and advantages may be achieved independently in various examples of the present disclosure, or may be combined in yet other examples, further details of which can be seen with reference to the following description and drawings.

DETAILED DESCRIPTION

Figure 1:
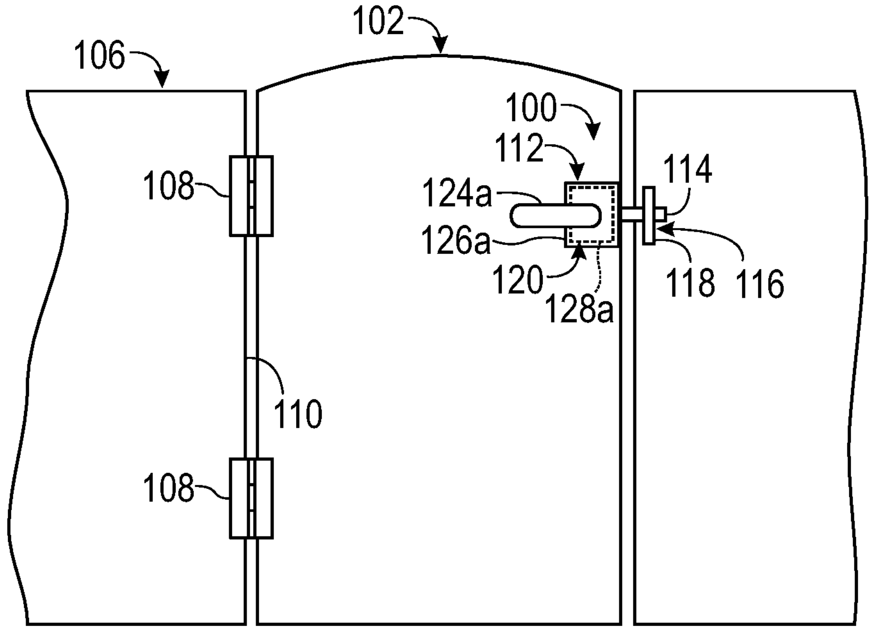
FIG. 1 is a fragmentary side view of a left-hinged gate pivotably attached to a fence and latched in a closed position using an illustrative gate fastening device that is adaptable to accommodate different gate configurations and user needs.

Various aspects and examples of a gate fastening device, as well as related methods, are described below and illustrated in the associated drawings. Unless otherwise specified, a gate fastening device, in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into Subsections A to F, each of which is labeled accordingly.

Overview

The present disclosure provides gate fastening devices and methods of installing the gate fastening devices.

In some examples, a gate fastening device may comprise a latching assembly including a latch pivotably coupled to a first support that mounts on a gate. The gate fastening device also may comprise an opposing assembly including a pivotable member coupled to a second support that mounts on the gate opposite the first support. The gate fastening device further may comprise a spindle, a handle, and/or a cover. The spindle may be configured to couple the latch and the pivotable member to one another through the gate for rotation as a unit. The handle also may include a base and a grip, with the base being attached, or configured to be attached, to the latch. The cover may be configured to be placed onto the first support and around the base of the handle.

In some examples, a gate fastening device may comprise a latching assembly having a front side opposite a back side and including a latch pivotably coupled to a support. The latching assembly may be configured to be operatively mountable on a left-hinged gate with the front side of the latching assembly facing the left-hinged gate and operatively mountable on a right-hinged gate with the back side of the latching assembly facing the right-hinged gate. The gate fastening device also may comprise a pair of handles each configured to be operatively coupled to the latch and respectively located on opposite sides of the left-hinged gate or the right-hinged gate. One of the handles may be configured to be mounted onto the back side of the latching assembly for the left-hinged gate and onto the front side of the latching assembly for the right-hinged gate.

In some examples, a method of installing a gate fastening device may comprise mounting a latching assembly on the gate. The latching assembly may include a latch pivotably coupled to a first support. An opposing assembly may be mounted on the gate opposite the first support. The opposing assembly may include a pivotable member coupled to a second support. The latch and the pivotable member may be coupled to one another through the gate for rotation as a unit. A base of a handle may be attached to the latch. A cover may be placed onto the first support and around the base of the handle.

In some examples, a method of installing a gate fastening device may be performed with a latching assembly having a front side opposite a back side and including a latch pivotably coupled to a support. The gate fastening device may be mounted such that the front side of the latching assembly faces the gate if the gate is left-hinged and such that the back side of the latching assembly faces the gate if the gate is right-hinged. A handle may be mounted to the latch on the back side of the latching assembly if the gate is left-hinged or on the front side of the latching assembly if the gate is right-hinged.

Figure 4:
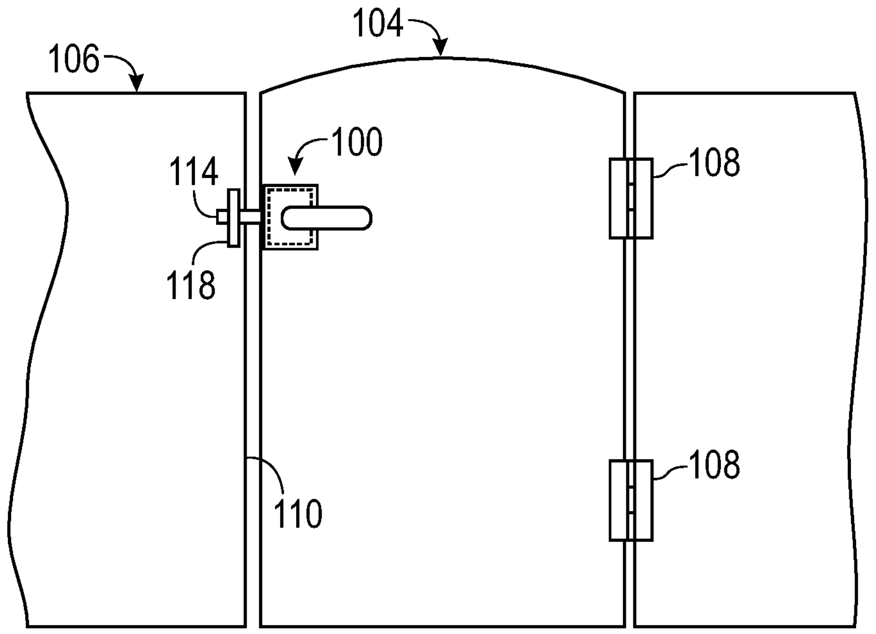
FIG. 4 is a fragmentary side view of a right-hinged gate pivotably attached to a fence and latched in a closed position using the gate fastening device of FIG. 1.
Figure 5:
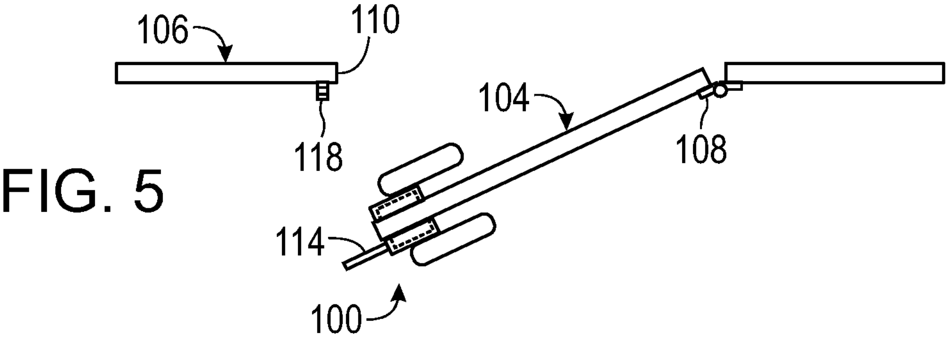
FIG. 5 is a fragmentary top view of the right-hinged gate, the fence, and the gate fastening device of FIG. 4, taken with the gate unlatched and pivoted to an open position.

FIGS. 1-5 show an illustrative gate fastening device 100 installed on either a left-hinged gate 102 (see FIGS. 1-3) or a right-hinged gate 104 (see FIGS. 4 and 5). Each gate 102, 104 is pivotably attached to a fence 106 (or other barrier) using one or more hinges 108. Gate fastening device 100 is securing each gate 102, 104 in a closed/latched position in FIGS. 1, 2, and 4. The gate fastening device has been disengaged in FIGS. 3 and 5, and the gate pivoted out of a gateway 110 defined by fence 106 (or other barrier(s)) to an open position.

A gate that is "left-hinged" opens by clockwise rotation (see FIGS. 2 and 3), and a gate that is "right-hinged" opens by counterclockwise rotation (see FIG. 5), where the clockwise/counterclockwise rotational direction is defined from a position above the gate. Gate fastening device 100 is adaptable for use with either hinged gate configuration.

Gate fastening device 100 has a gate-mounted portion 112 providing a latch 114, and a fence-mounted portion 116 providing a catch 118 for the latch (see FIG. 1). Gate-mounted portion 112 has a latching assembly 120 that mounts onto one side of a gate (e.g., a front side) and an opposing assembly 122 that mounts onto the opposite side of the gate (e.g., a back side) (see FIGS. 1 and 2). Latching assembly 120 includes latch 114 and may be mounted onto the same side of the gate as hinges 108. Latching assembly 120 and hinges 108 are respectively mounted to opposite lateral edge regions of the gate.

Latching assembly 120 and opposing assembly 122 each may be configured to be mounted to a gate in two different orientations, based on whether the gate is left-hinged or right hinged. In Subsection A below, the two different orientations are related to one another by rotation of the assembly by one-half turn about a vertical axis, to switch the positions of front and back sides of the assembly. In Subsection B below, the two different orientations are related to one another by rotation of the assembly by one-half turn about a horizontal axis that is parallel to the pivot axis of the latch, to switch the positions of upper and lower edges of the assembly.

Figure 2:
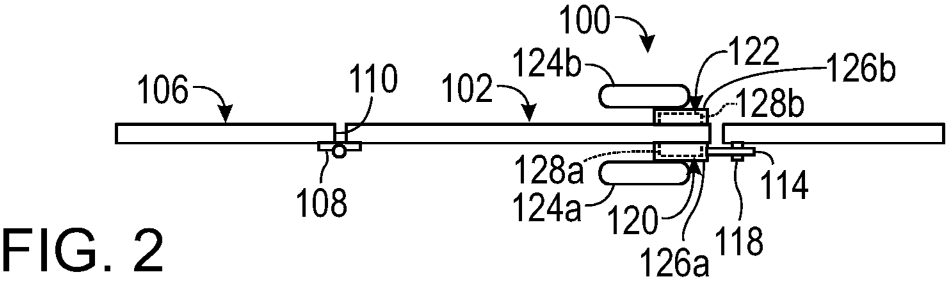
FIG. 2 is a fragmentary top view of the left-hinged gate, the fence, and the gate fastening device of FIG. 1.
Figure 3:
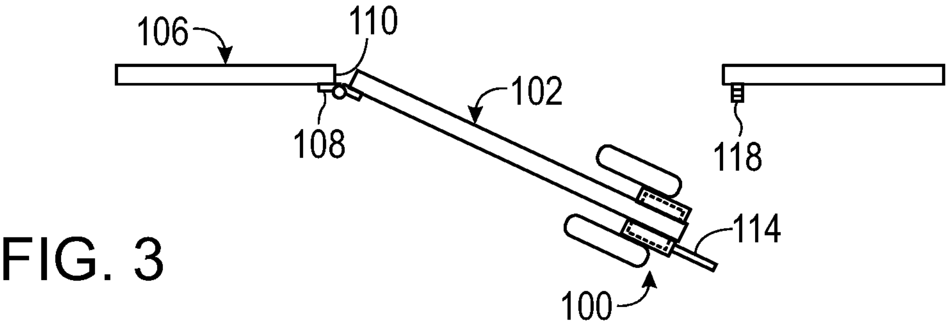
FIG. 3 is a fragmentary top view of the left-hinged gate, the fence, and the gate fastening device of FIG. 1, taken as in FIG. 2 except with the left-hinged gate unlatched and pivoted to an open position.

Gate-mounted portion 112 also includes a latch-side handle **124*a* and an opposing-side handle 124*b* (see FIGS. 1 and 2). The handles 124*a*, 124*b* are rotationally coupled to one another and latch 114, such that turning either handle rotates the latch. Accordingly, the rotational position of the latch can be manipulated by a user from either side of the gate. The handles may be configured to be attached respectively to latching assembly 120 and opposing assembly 122** by a user and may be identical to, and/or interchangeable with, one another. This attachability allows the user to choose the style, position, and/or orientation of each handle, to customize or adapt the gate fastening device as needed.

Gate-mounted portion 112 further may include latch-side and opposing-side covers **126*a*, 126*b* for latching assembly 120 and opposing assembly 122, respectively (see FIGS. 1 and 2). Each cover 126*a*, 126*b* may be placed onto, and connected to, a latch-side or opposing-side support 128*a* or 128*b*** of the assembly, to hide apertures of the support and prevent access to, and/or backing out of, fasteners located in the apertures and used to mount the support to the gate. The covers may be identical to, and/or interchangeable with, one another.

Examples, Components, and Alternatives

The following subsections describe selected aspects of illustrative gate fastening devices. The examples in these subsections are intended for illustration and should not be interpreted as limiting the entire scope of the present disclosure. Each subsection may include one or more distinct examples, and/or contextual or related information, function, and/or structure.

A. Gate Fastening Device with Reversible Supports

This subsection describes an illustrative gate fastening device 200 having reversibly-mountable supports **228*a*, 228*b*; see FIGS. 6-16**.

Figure 6:
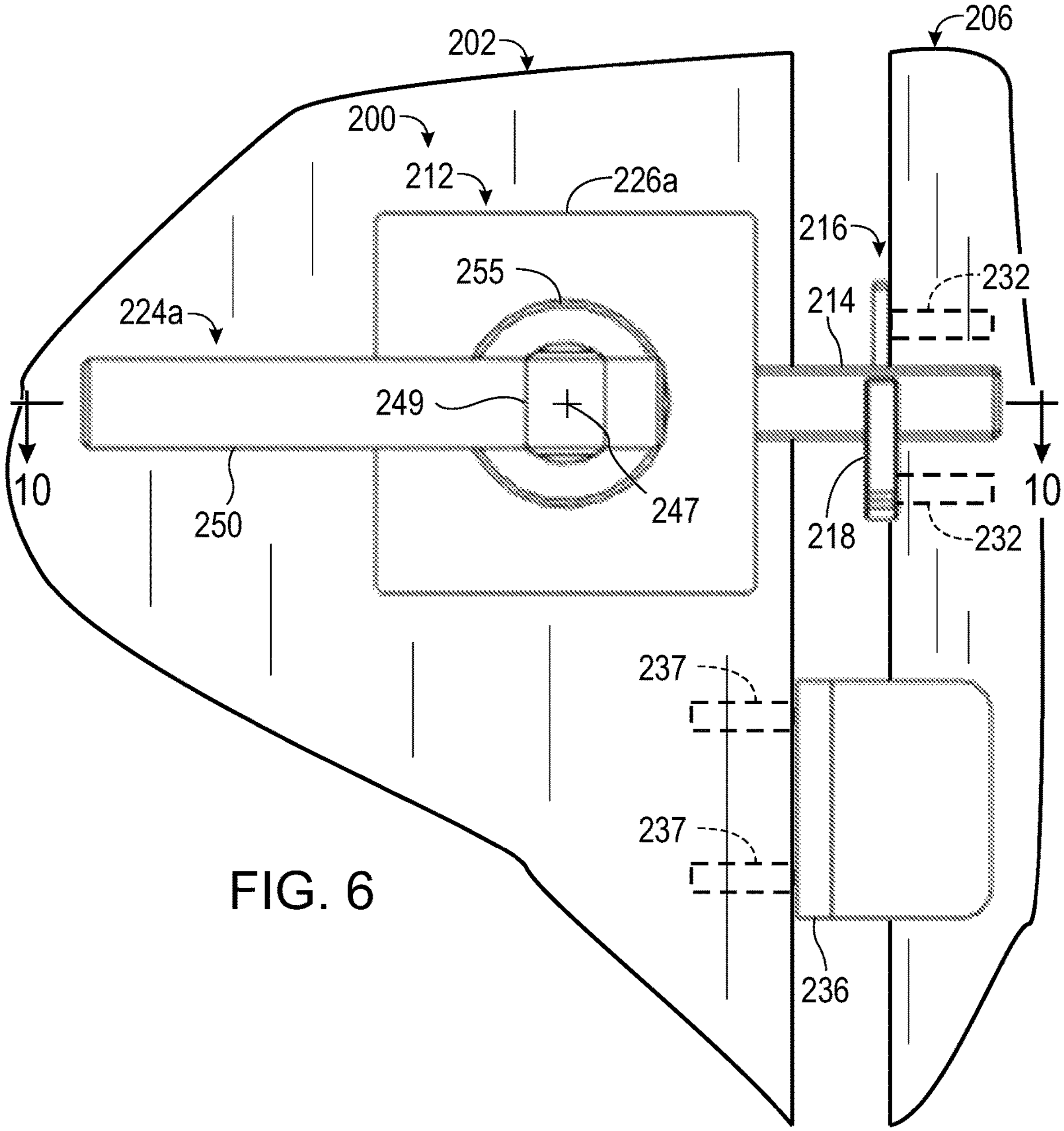
FIG. 6 is a fragmentary elevation view of another illustrative gate fastening device mounted to a gate and a fence, and a stop device mounted separately to the gate.

FIG. 6 shows gate fastening device 200 mounted to a left-hinged gate 202 and a fence 206. A gate-mounted portion 212 of device 200 including a latch 214 is attached to the gate using support fasteners 230, which are received in support apertures 231 defined by supports **228*a*, 228*b* (see FIGS. 7, 9, and 11) and which extend into gate 202. A fence-mounted portion 216 of gate fastening device 200, which includes a catch 218, is attached to fence 206 in horizontal alignment with latch 214 using catch fasteners 232 (see FIG. 6). Catch 218 defines catch apertures 233 to receive catch fasteners 232, which extend from the apertures into the fence (see FIG. 7). The catch has a ramp 234 and a slot 235 (see FIGS. 7 and 9). Ramp 234 contacts latch 214 as the gate is being closed and urges upward rotation of latch 214. The latch travels upwardly along and over the ramp and then enters slot 235 by downward rotation. In this configuration, interaction of latch 214 and catch 218 with one another latches gate 202 to fence 206** in a closed position.

Gate fastening device 200 may be supplemented with a stop device 236 mounted to gate 202 using stop fasteners 237 (see FIG. 6). The stop device may be mounted under (or over) gate-mounted portion 212 and overlapping fence 206. Stop device 236 is configured to contact fence 206 when gate 202 is latched, to prevent damage to gate-mounted portion 212 (e.g., if the gate is slammed shut).

Figure 7:
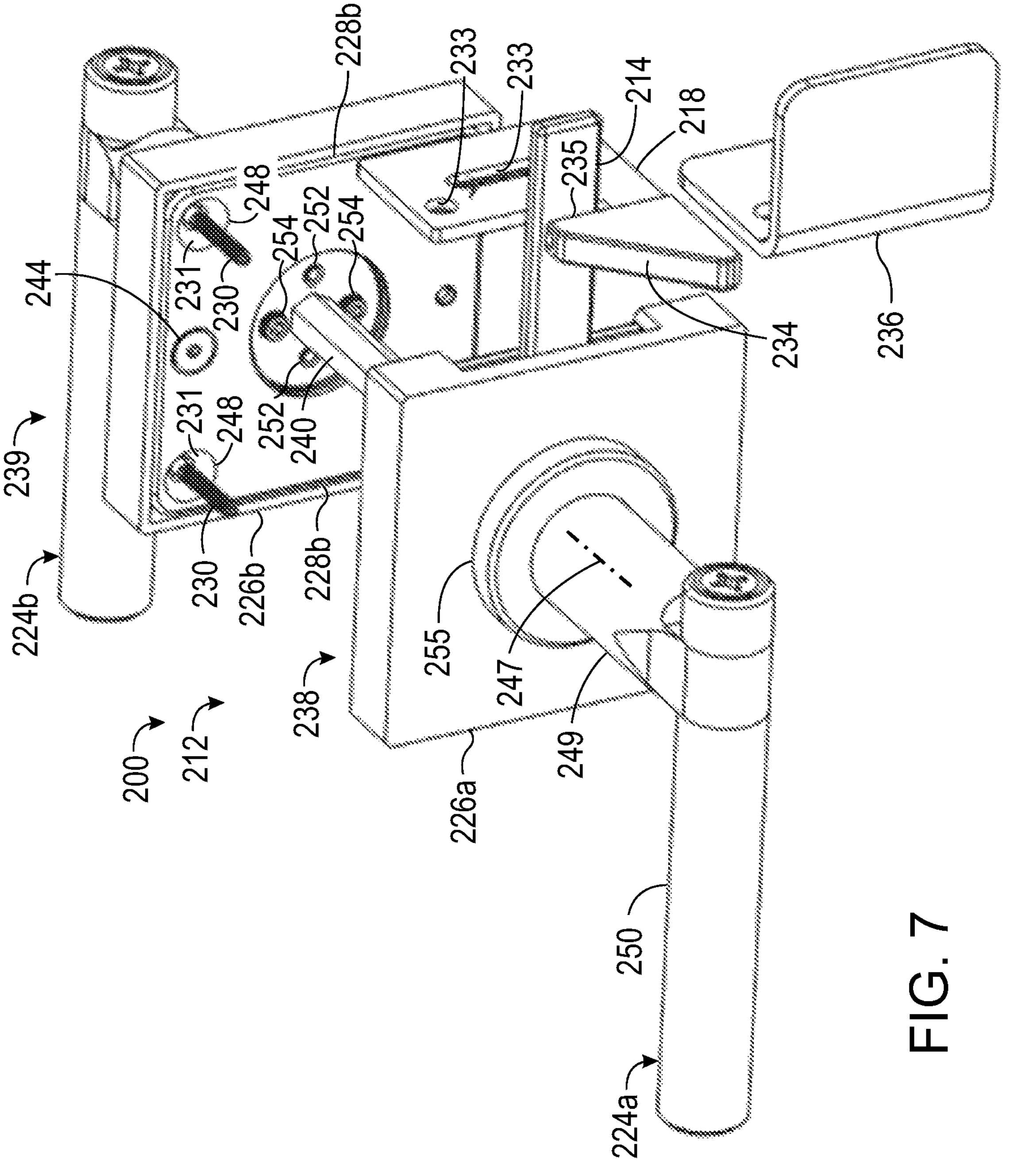
FIG. 7 is an isometric view of the gate fastening device and the stop device of FIG. 6, taken in isolation from the gate and the fence.
Figure 8:
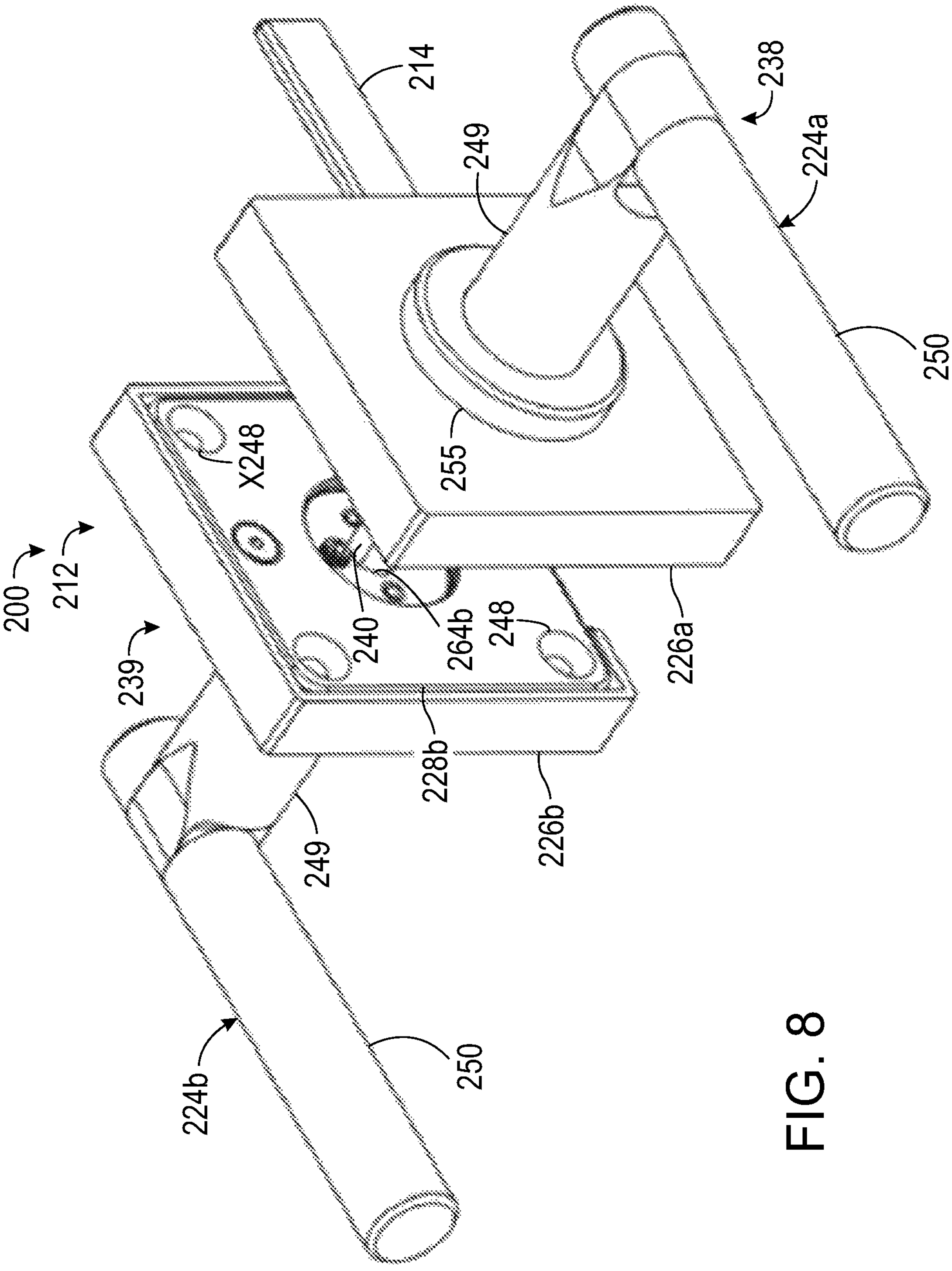
FIG. 8 is an isometric view of a gate-mountable portion of the gate fastening device of FIG. 6, taken in isolation from the gate, the fence, and the stop device.

FIGS. 7 and 8 show gate-mounted portion 212 in the absence of gate 202 and fence 206. Gate-mounted portion 212 includes a latch-side portion 238 that mounts to one side of the gate, an opposing-side portion 239 that mounts to the opposite side of the gate, and a spindle 240 that transmits torque between latch-side portion 238 and opposing-side portion 239 to provide rotational coupling.

Figure 9:
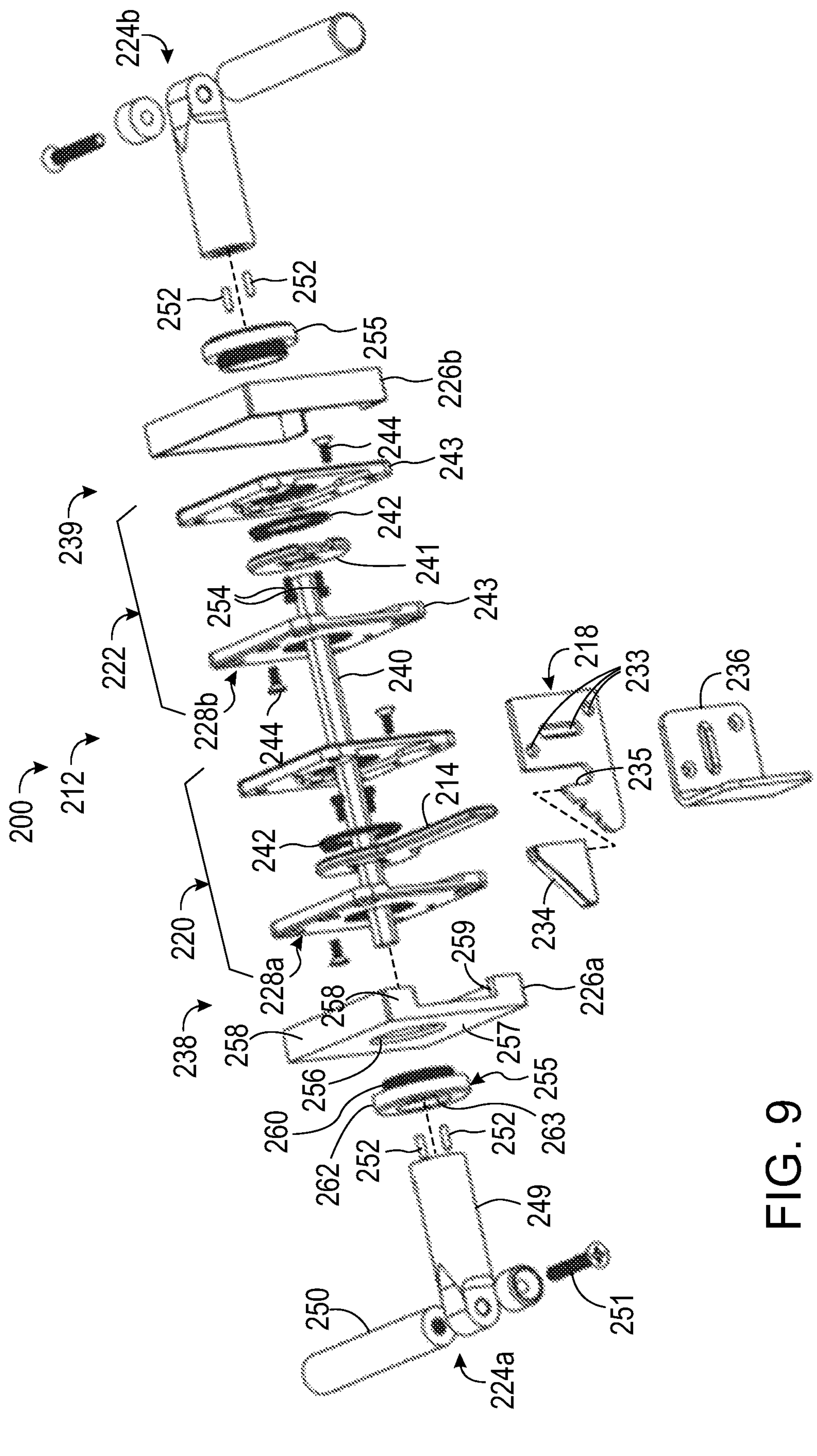
FIG. 9 is an exploded view of the gate fastening device and stop device of FIG. 6.

FIG. 9 shows an exploded view of gate-mounted portion 212. Latch-side portion 238 and opposing-side portion 239 of gate-mounted portion 212 may be identical to one another, as shown, except that opposing-side portion 239 has a pivotable member 241 instead of latch 214. Latch-side portion 238 includes a latching assembly 220, a latch-side handle 224*a*, and a latch-side cover 226*a*. Similarly, opposing side portion 239 includes an opposing assembly 222, an opposing-side handle 224*b*, and an opposing-side cover 226*b*.

Latching assembly 220 is composed of latch 214, latch-side support 228*a*, and a biasing member 242 (e.g., a spring, such as a torsion spring). Latch 214 is pivotable with respect to latch-side support 228*a*, and biasing member 242 biases the rotational position of latch 214 to an equilibrium (horizontal) position. Latch-side support 228*a* is formed by two copies of a structural member 243, which are identical to one another. The copies of structural member 243 are attached to one another, such as with one or more fasteners 244, to form a holder for latch 214 and biasing member 242. The holder may be described as a housing. In other examples, the latch-side support may be formed by only one structural member (see Subsection B below) or two or more structural members that are not identical to one another.

Figure 11:
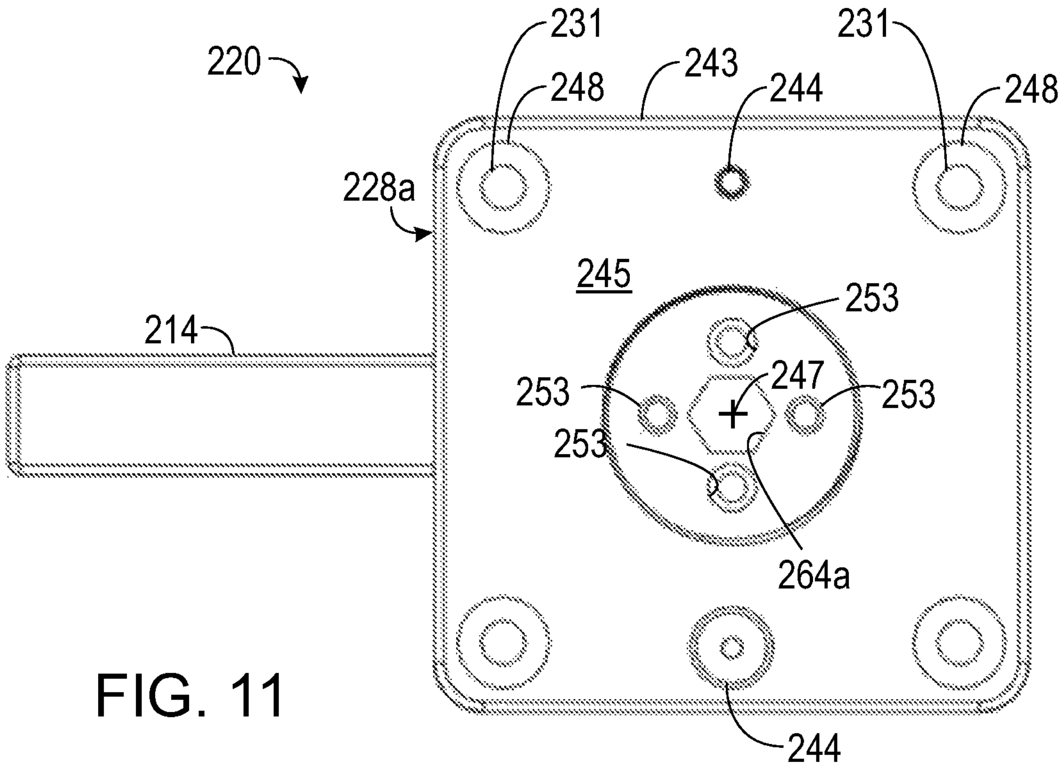
FIG. 11 is a front side view of a latching assembly of the gate fastening device of FIG. 6.
Figure 12:
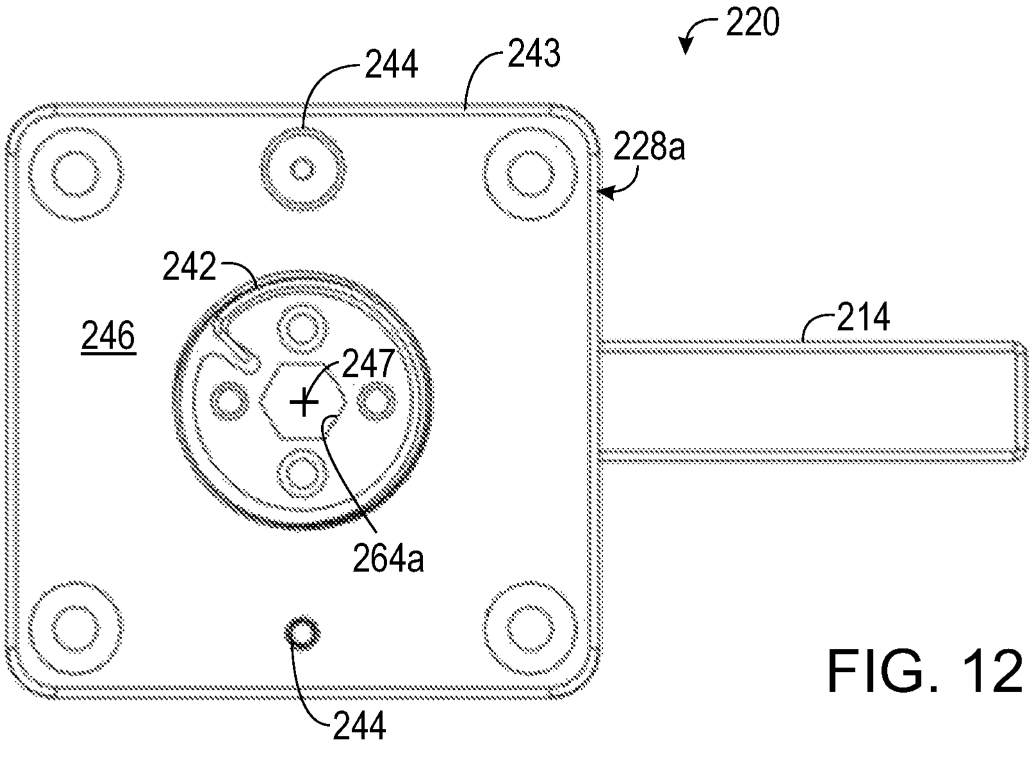
FIG. 12 is a back side view of the latching assembly of FIG. 11.

Latch-side support 228*a* has a front surface 245 and a back surface 246 spaced from one another along the pivot axis 247 of latch 214, which is defined by spindle 240 (see FIGS. 9, 11, and 12). Front surface 245 is located on a front side of latching assembly 220, and back surface 246 is located on a back side of the latching assembly. The designations of "front" and "back" for surfaces 245, 246 (and sides of the latching assembly) are arbitrary, because latch-side support 228*a* is configured to be reversibly-mountable, such that either front surface 245 faces a left-hinged gate or back surface 246 faces a right-hinged gate. Front and back surfaces 245, 246 may be flat to avoid wobble and facilitate stable attachment to the gate. Each of support apertures 231 defined by latch-side support 228*a* is enlarged in diameter at both opposite ends to form a countersink 248 at each of the opposite ends. Each countersink 248 is configured to receive a head of a support fastener 230 to avoid protrusion above front surface 245 or back surface 246 of the support (also see FIG. 7). Accordingly, the pair of countersinks 248 formed at opposite ends of a support aperture 231 allow a support fastener 230 to be flush or recessed when installed from either opposite end of the support aperture 231.

Opposing assembly 222 is identical to latching assembly 220 except that latch 214 is replaced by pivotable member 241 (see FIG. 9). Accordingly, opposing-side support 228*b* of opposing assembly 222 is identical to latch-side support 228*a*, and is formed by two more copies of the same structural member 243 as latch-side support 228*a*. Also, opposing assembly 222 has a biasing member 242 that rotationally biases the position of pivotable member 241, and which is identical to biasing member 242 of latching assembly 220.

Handles 224*a*, 224*b* are configured to be mounted respectively to latch 214 and pivotable member 241 by a user when gate fastening device 200 is being installed. Each handle 224*a*, 224*b* has a base 249, a grip 250 configured to be grasped by a user's hand, and a grip fastener 251 that attaches grip 250 to base 249. A pair of pins 252 are coupled to and project from an end of the handle opposite the grip. Base 249 is mountable to latch 214 or pivotable member 241 at a set of holes 253 defined by the latch or pivotable member (also see FIG. 11). Pins 252 are placed into an opposing pair of holes 253 from one side of latch 214 or pivotable member 241. The pins function to ensure proper alignment rotationally of latch 214 or pivotable member 241 and apertures 253*a* defined by base 249 (see FIG. 16). Then, handle fasteners 254 are placed through another opposing pair of holes 253 of latch 214 or pivotable member 241 from the opposite side of latch 214 or pivotable member 241, and into threaded engagement with aligned apertures 253*a* of base 249 (also see FIGS. 7 and 9). Each handle 224*a*, 224*b* is configured to be mountable alternatively to either (front/back) side of latching assembly 220 and either (front/back) side of opposing assembly 222. For example, if the front side of latching assembly 220 will face a left-hinged gate, handle 224*a* is mounted to latch 214 on the back side of latching assembly 220. Handle 224*a* is mounted on the front side of latching assembly 220 when latching assembly 220 is reversed for a right-hinged gate.

Each cover 226*a*, 226*b* fits onto either support 228*a*, 228*b* and is locked to the support, such as with a securing member 255 or snap-fit attachment (see FIG. 9). The cover defines a central opening 256 that is sized and shaped to allow handle base 249 to extend through the cover. The cover includes a front wall 257 to hide a front surface or back surface of support 228*a* or 228*b* (and also to conceal apertures defined by the support and fasteners received in the apertures). Lateral walls 258 of the cover project orthogonally from front wall 257 to conceal lateral sides of support 228*a* or 228*b*. One of lateral walls 258 forms a cutout region 259 to accommodate projection of latch 214 out of the cover and rotation of the latch. Front wall 257 is sized and shaped to correspond to front surface 245 or back surface 246 of support 228*a* or 228*b*. In the example depicted, front and back surfaces 245, 246 and front wall 257 are square, which allows opposing-side cover 226*b* to be placed onto opposing-side support 228*b* with a 90-degree rotational offset from latch-side cover 226*a*. This rotational offset positions cutout region 259 at the bottom of opposing assembly 222 where the cutout region is less visible, as shown in FIG. 9.

Securing member 255 is structured to provide attachment of the corresponding cover 226*a* or 226*b*, while permitting rotation of the associated handle 224*a* or 224*b* (see FIGS. 7-10). A threaded region 260 of the securing member fits through central opening 256 of cover 226*a* or 226*b* for threaded engagement with a complementary threaded region 261 defined by support 228*a* or 228*b* (see FIGS. 9 and 13). Securing member 255 has a flange 262 that is larger in diameter than central opening 256 of cover 226*a* or 226*b*, and which engages front wall 257 of the cover to prevent removal of the cover (see FIG. 9). The securing member defines an axial passageway 263 that is larger in diameter than the proximal end of base 249 of handle 224*a* or 224*b*, to permit assembly of securing member 255 with support

228*a* or 228*b* after base 249 has been mounted onto latch 214 of latching assembly 220 or pivotable member 241 of opposing assembly 222.

Figure 10:
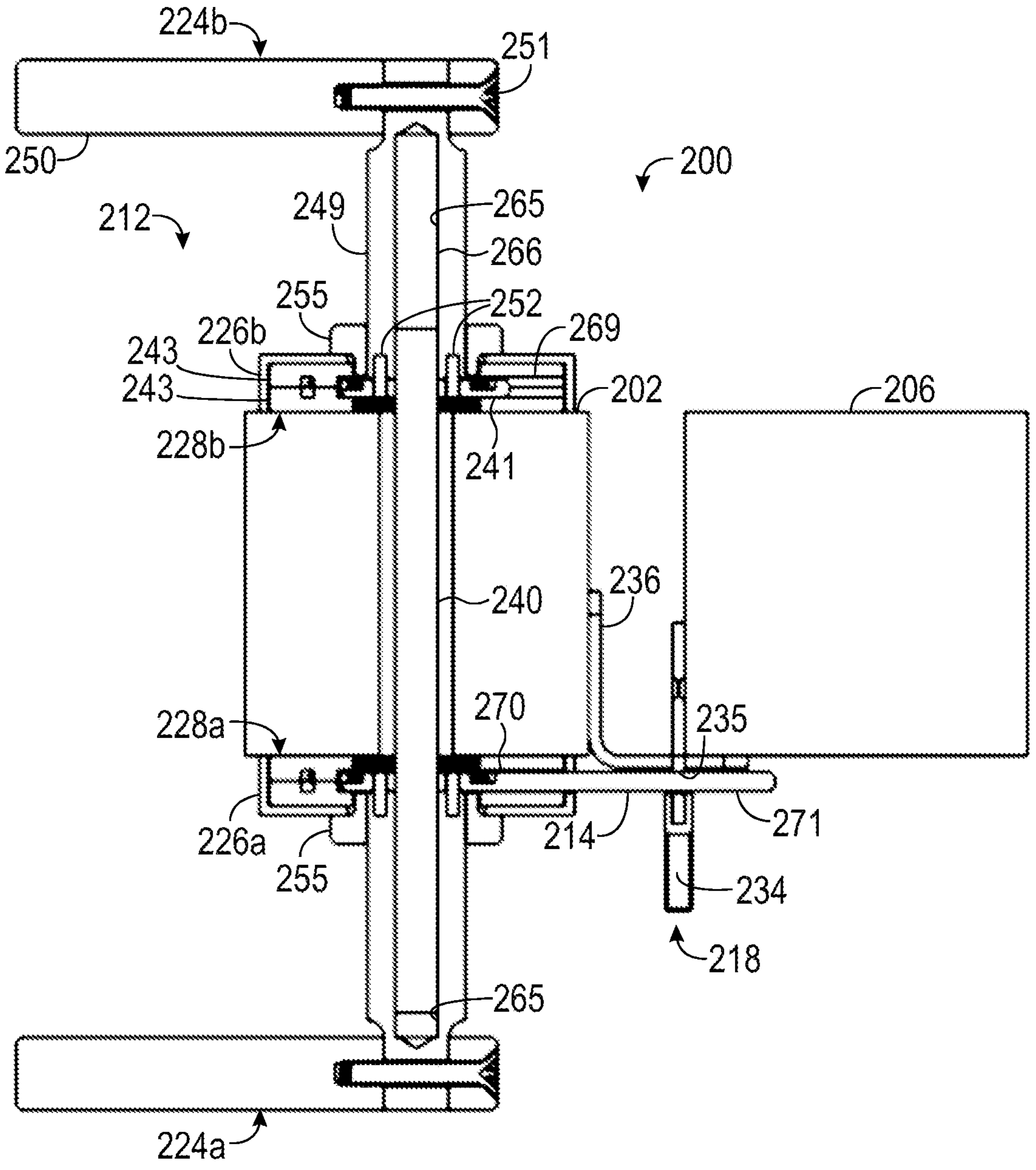
FIG. 10 is a sectional view of the gate fastening device, stop device, gate, and fence of FIG. 6, taken generally along line 10-10 in FIG. 6, except with the gate and fence shown schematically as blocks.

Spindle 240 extends through latching assembly 220, gate 202 (or 204), and opposing assembly 222, and into handles 224*a*, 224*b* (see FIGS. 9 and 10). In the depicted example, the spindle is hexagonal in cross-section and fits closely in hexagonal openings 264*a*, 264*b* defined by latch 214 and pivotable member 241, respectively, such that the spindle, latch, and pivotable member rotate as a unit about pivot axis 247 defined by the spindle. In other examples, spindle 240 and openings 264*a*, 264*b* may have any other suitable complementary shapes (e.g., triangular, square, pentagonal, heptagonal, and octagonal, among others) that resist rotational slippage. Each end of spindle 240 fits into a respective void 265 defined by base 249 of one of handles 224*a*, 224*b* (see FIG. 10). The void is sized to permit an adjustable length portion of spindle to extend into the base, which allows the gate fastening device to be installed on gates having a range of different thicknesses. Each void 265 may be complementary to spindle 240 to resist rotation slippage, to couple rotation of handle base 249 and spindle 240 with one another about the pivot axis.

Axial travel of spindle 240 may be restricted by placing an insert 266 of appropriate length into one or both voids 265 before ends of the spindle are introduced into the voids. Reduced travel may keep the spindle in engagement with both latch assemblies. The insert may be cut to an appropriate length, if needed, from a longer insert piece, before the insert is placed into the void. In this way, commercial embodiments may include a single insert, or just a few inserts, rather than a collection of inserts intended to accommodate all gate thicknesses. The insert may be cut using any suitable cutting implement, such as scissors, shears, or knives, among others. In some examples, the appropriate length may be determined based on the thickness of the gate. For example, no insert may be needed with a thin gate (because the spindle occupies the full space between gate handles), while a maximum length insert may be needed for a thick gate. Exemplary gate thicknesses may range between about 1 or 1.5 inches (requiring little or no insert length) and about 5.5 or 6 inches (requiring a large insert length), among others. Typically, although not necessarily, equal-length inserts will be cut and placed at each end of the spindle. Inserts may have any suitable size and composition compatible with its spacing and biasing function. In some cases, inserts may be compressible or elastic, allowing some forgiveness if the insert is cut too long while simultaneously providing a bias force tending to center the spindle. An exemplary insert may include a rubber cord, among others.

Figure 13:
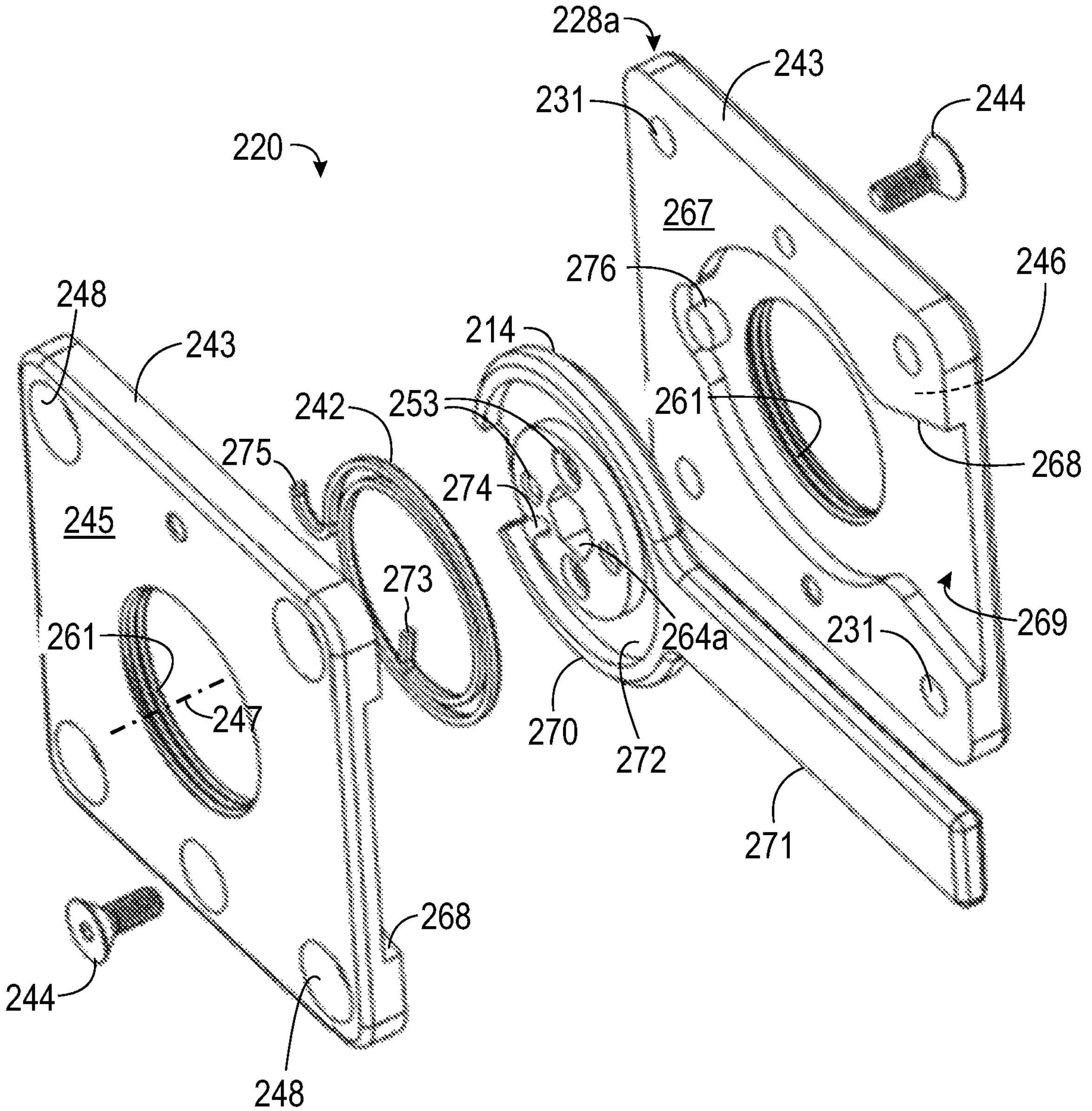
FIG. 13 is an isometric exploded view of the latching assembly of FIG. 11.

FIG. 13 shows an exploded view of latching assembly 220. Each of the two copies of structural member 243 has an inner surface 267 defining a recess 268. Assembly of the two copies to form support 228*a* creates a cavity 269 from recesses 268 of the two copies of structural member 243. Cavity 269 is open axially on pivot axis 247 to allow latch 214 to be coupled to spindle 240 and latch-side handle 224*a* (also see FIG. 9). The cavity is also open laterally, to allow latch 214 to project from support 228*a* and interface with catch 218 (also see FIG. 7).

Figure 14:
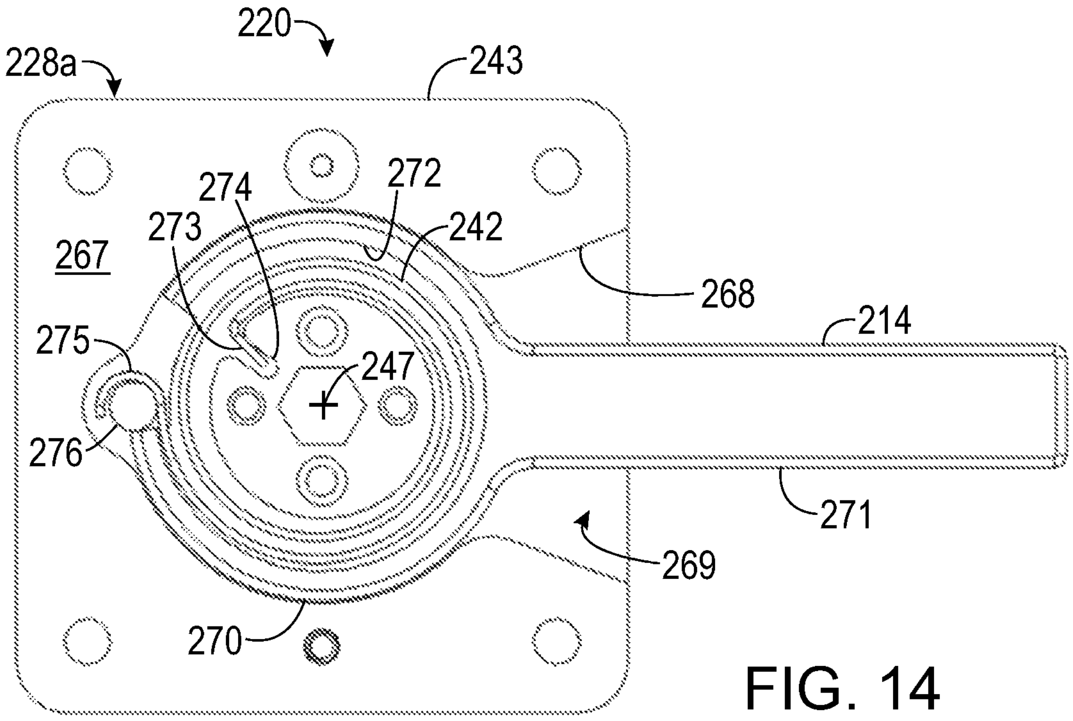
FIG. 14 is a back side view of only a portion of the latching assembly of FIG. 11, taken with one of the copies of a structural member of a support of the latching assembly removed, and with the latch of the latching assembly in a horizontal closed position.
Figure 15:
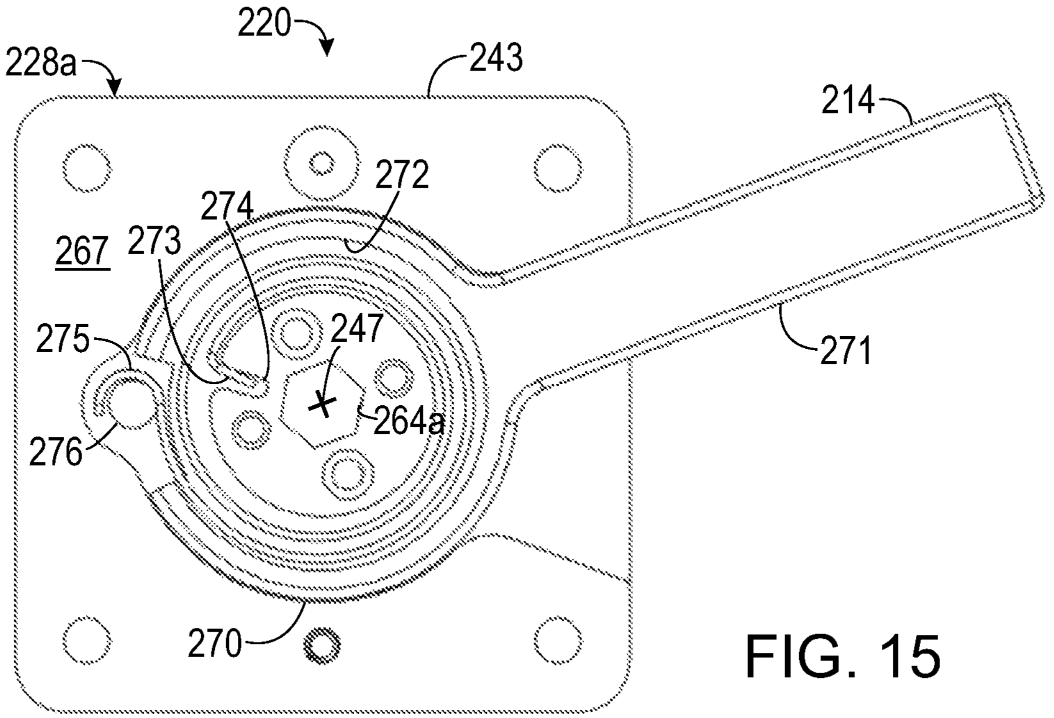
FIG. 15 is another back side view of only the portion of the latching assembly of FIG. 14, taken with the latch pivoted upward from the closed position of FIG. 14 against a biasing force exerted by a biasing member structured as a torsion spring.
Figure 16:
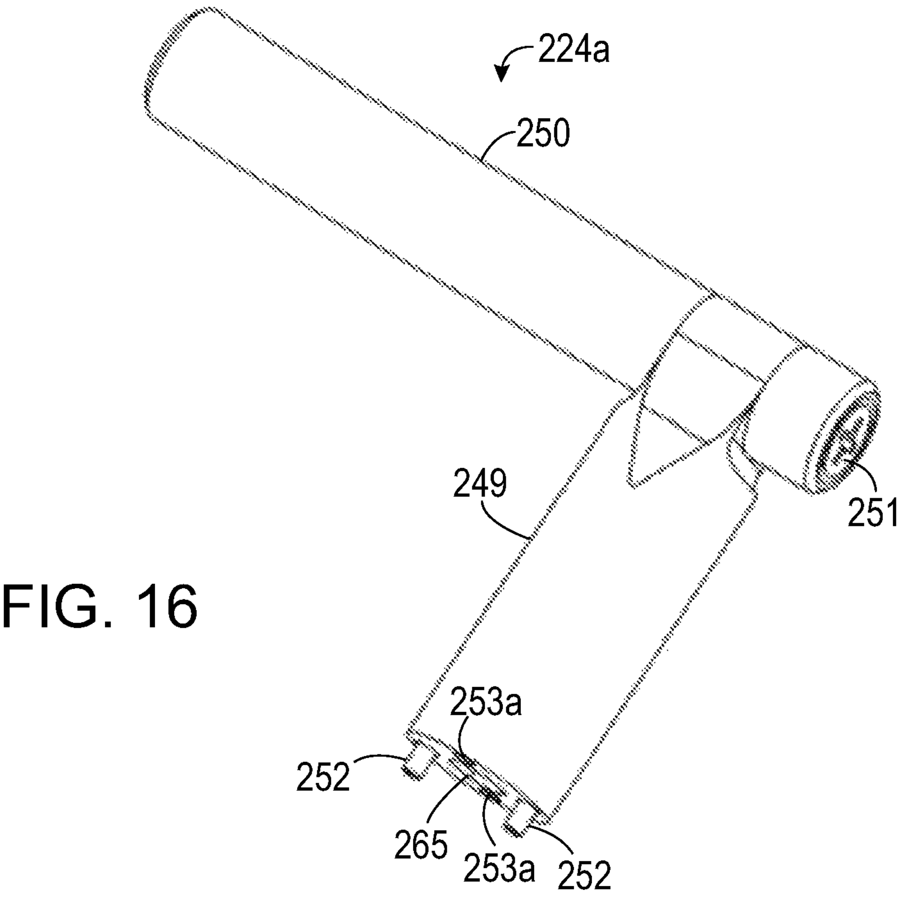
FIG. 16 is an isometric view of a handle of the latching assembly of FIG. 6 taken in isolation.

Latch 214 includes a proximal portion 270 and a distal portion 271 (see FIGS. 13-15). Proximal portion 270 provides a base of latch 214 and defines hexagonal opening 264*a*. The proximal portion of latch 214 is captured in cavity 269 when the two copies of structural member 243 are attached to one another with fasteners 244 (also see FIG. 9), while remaining rotatable in the cavity. Proximal portion 270 defines holes 253 and a circular groove 272. A main portion of biasing member 242 fits in groove 272. A first end 273 of biasing member 242 extends into an indentation 274 branching from groove 272. A second end 275 of biasing member 242 is hooked onto a protrusion 276 formed by at least one of the two copies of structural member 243 of latch-side support 228*a*. When latch 214 pivots about pivot axis 247, second end 275 remains fixed at protrusion 276, while first end 273 follows an arcuate path with indentation 274 of latch 214 (compare FIGS. 14 and 15).

Distal portion 271 of latch 214 projects from support 228*a* (see FIG. 14). The distal portion forms a bar of latch 214 that interacts with catch 218 (also see FIGS. 6 and 7). Pivotable member 241 of opposing assembly 222 is identical to latch 214, except with the bar of distal portion 271 eliminated.

FIGS. 14 and 15 show latch 214 in a closed position and an open position, respectively. In FIG. 14, biasing member 242 is in an equilibrium position and the longitudinal axis of distal portion 271 is horizontal. In FIG. 15, biasing member is in an elastically deformed position (e.g., produced by rotating one of handles 224*a*, 224*b* or urging latch 214 against the ramp of catch 218), and the longitudinal axis of distal portion 271 is inclined upward. Protrusion 276 obstructs rotation of latch 214 in the opposite rotational direction from the closed position of FIG. 14. In other examples, the latch is able to rotate in opposite directions from a closed position and is biased toward the closed position (see Subsection B).

B. Gate Fastening Device with Invertible Supports

This subsection describes an illustrative gate fastening device 300 having invertibly-mountable supports 328*a*, 328*b*; see FIGS. 17-22.

Figure 17:
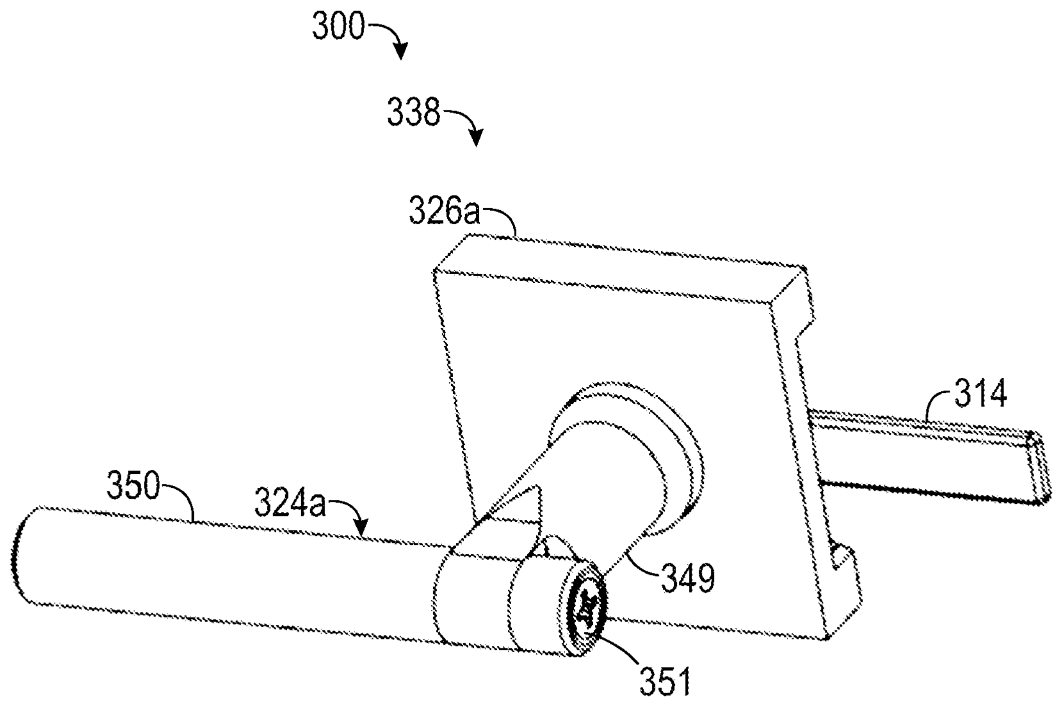
FIG. 17 is an isometric view of only a latch-side portion of another illustrative gate fastening device that is adaptable to accommodate different gate configurations and user needs.
Figure 18:
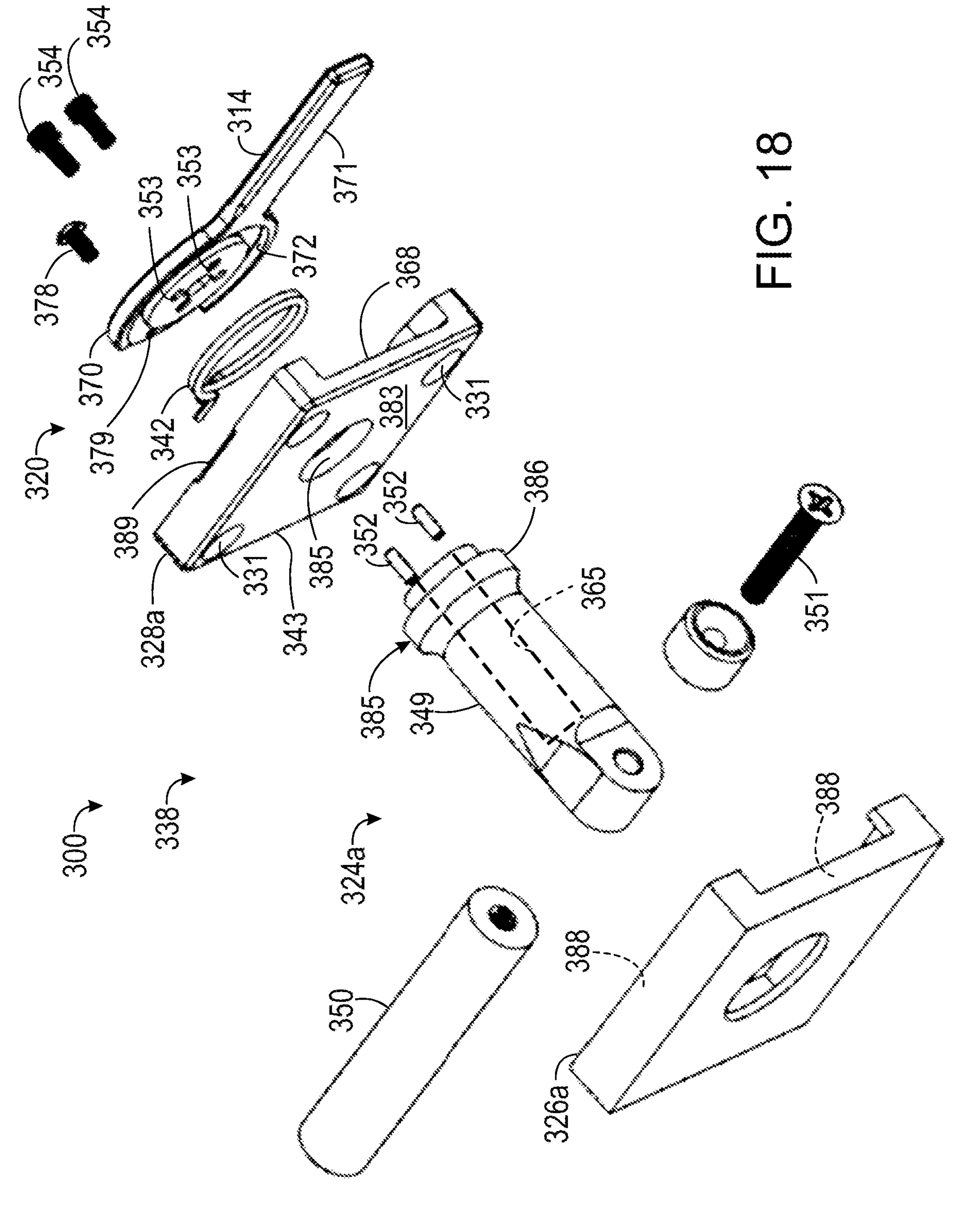
FIG. 18 is an isometric exploded view of the latch-side portion of the gate fastening device of FIG. 17.

FIGS. 17 and 18 show only a latch-side portion 338 of gate fastening device 300. Latch-side portion 338 includes a latching assembly 320, a handle 324*a*, and a cover 326*a*. Gate fastening device 300 also includes an opposing-side portion that mounts to an opposite side of a gate from latch-side portion 338, as described above in Subsection A for gate fastening device 200. The opposing-side portion is identical to latch-side portion 338 except for replacement of a latch 314 with a pivotable member (see Subsection A), and, optionally, use of non-identical handles and/or non-identical covers for the latch-side portion and the opposing-side portion.

Figure 19:
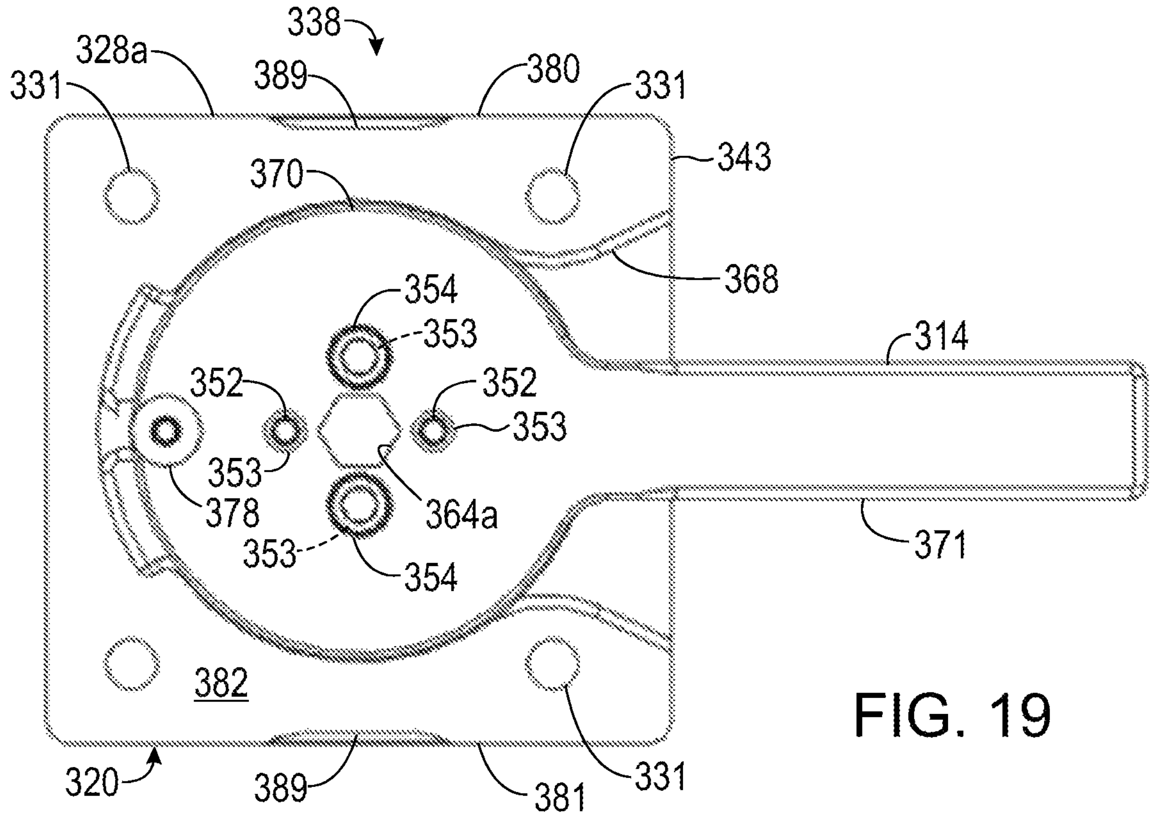
FIG. 19 is an inner side view of the latch-side portion of the gate fastening device of FIG. 17, taken with a latch of the latch-side portion in a closed position.
Figure 20:
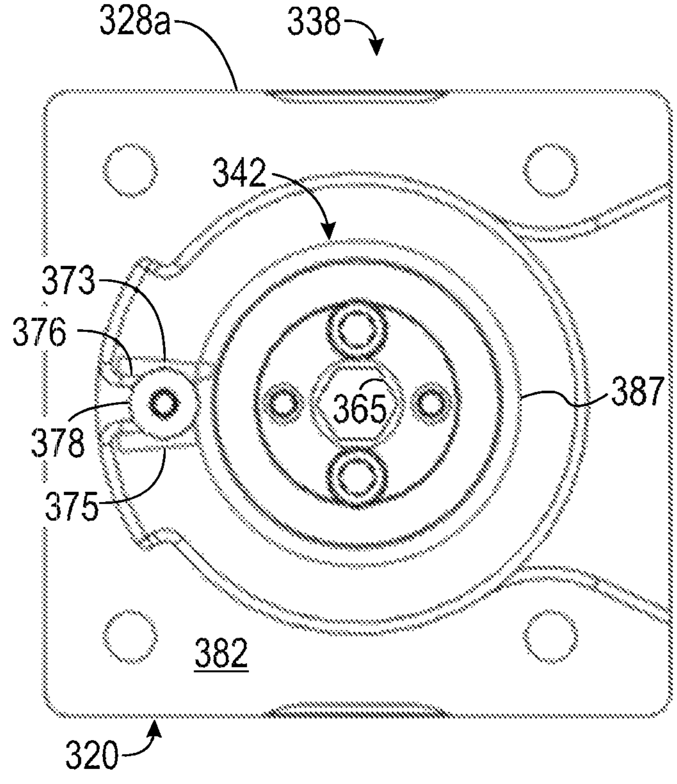
FIG. 20 is another inner side view of the latch-side portion of FIG. 19, taken with only the latch removed and showing a biasing member that biases the latch to the closed position of FIG. 19, whether the latch is rotated upward or downward from the closed position.

Latching assembly 320 is composed of latch 314, a latch-side support 328*a*, and a biasing member 342 (see FIGS. 18-20). Latch 314 has a proximal portion 370 and a distal portion 371, with the distal portion projecting from latch-side support 328*a*, generally as described above for latch 214 in Subsection A. Like proximal portion 270 of Subsection A, proximal portion 370 defines a plurality of holes 353 for mounting handle 324*a* to the proximal portion of the latch (see FIGS. 18 and 19), a hexagonal opening 364*a* to receive a spindle 340 (see FIGS. 19 and 21), and a groove 372 in which a main portion of biasing member 342 is located (see FIG. 18). Latch 314 also has a threaded member 378 attached to proximal portion 370 at an aperture 379 thereof (see FIGS. 18-20). A leading end of threaded member 378 projects from proximal portion 370 for engagement with biasing member 342, as described further below.

Latch-side support 328*a* is configured to be alternatively mounted to either a left-hinged gate or a right-hinged gate, with the support inverted on one of the gates relative to the other gate. Support 328*a* has a first edge 380 opposite a second edge 381 (see FIG. 19). When support 328*a* is mounted on a left-hinged gate, first edge 380 is the lower edge and second edge 381 is the upper edge. When support 328*a* is mounted on a right-hinged gate, the support is inverted such that the relative positions of edges 380, 381 are switched, namely, first edge 380 becomes the upper edge and second edge 381 becomes the lower edge. Latch-side support 328*a* defines support apertures 331 to receive fasteners that mount the support on the gate.

Latch-side support 328*a*, unlike latch-side support 228*a* of Subsection A, has only a single structural member 343 to hold latch 314 (see FIGS. 18 and 19). Latch-side support 328*a* has an inner surface 382 opposite an outer surface 383 (see FIGS. 18-20). The latch-side support defines a recess 368 sized to receive proximal portion 370 of latch 314 and permit rotation of the proximal portion in the recess (see FIG. 19). After latch-side support 328*a* is mounted on a gate, with inner surface 382 facing the gate, the gate covers an open side of recess 368 to form a cavity (collectively with latch-side support 328*a*), in which proximal portion 370 is housed. In other examples, latch-side support 328*a* may include a plate that is attached to structural member 343 on inner surface 382, to trap latch 314 in a cavity formed with recess 368.

Handle 324*a*, like handle 224*a* of Subsection A, includes a base 349 defining a void 365 to receive an end of spindle 340, and also includes a grip 350, a grip fastener 351, and a pair of pins 352 (see FIGS. 18 and 20). Fasteners 354 attached base 349 to latch 314. An inner end region 384 of base has a greater diameter than an axial opening 385 of latch-side support 328*a* through which base 349 is mounted to latch 314 (see FIG. 18). This greater diameter is formed by a flange 386 in the depicted example. Latch 314 becomes captured in recess 368 of support 328*a* when base 349 is mounted to the latch.

Figure 21:
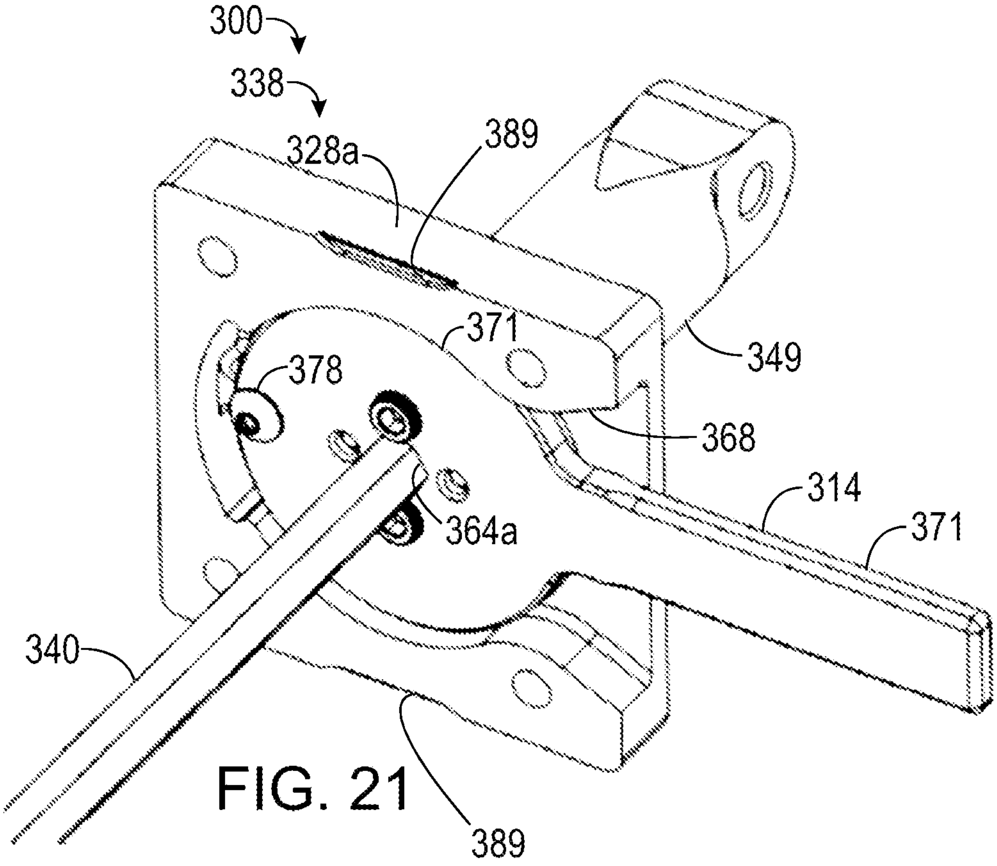
FIG. 21 is an isometric view of the latch-side portion of FIG. 19, taken in the presence of a spindle that provides rotational coupling of handles of the gate fastening device.
Figure 22:
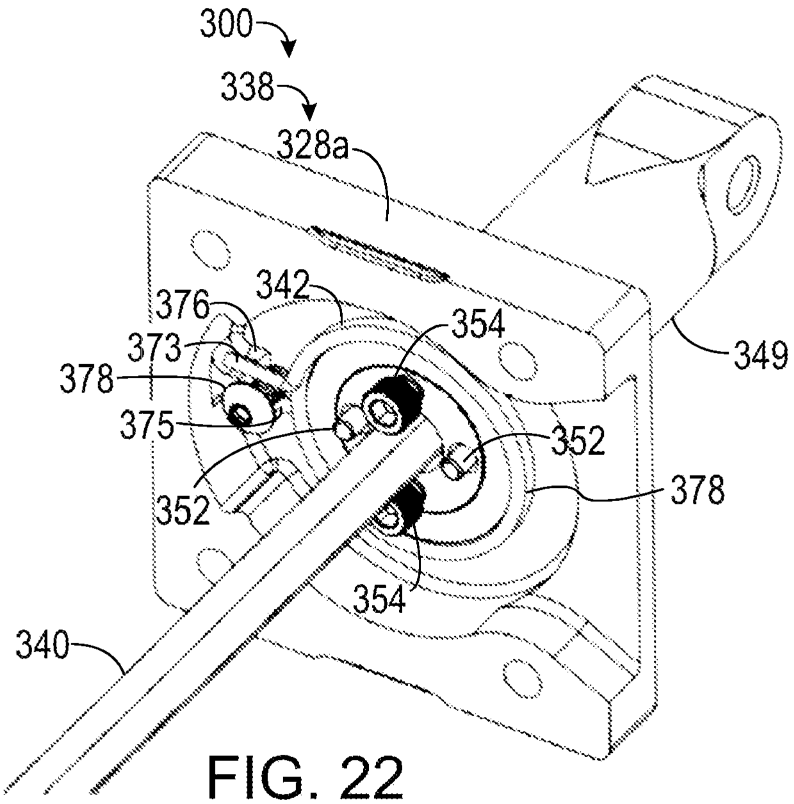
FIG. 22 is an isometric view of the latch-side portion of FIG. 20, taken with the latch removed as in FIG. 20 and in the presence of the spindle of FIG. 21.
Figure 23:
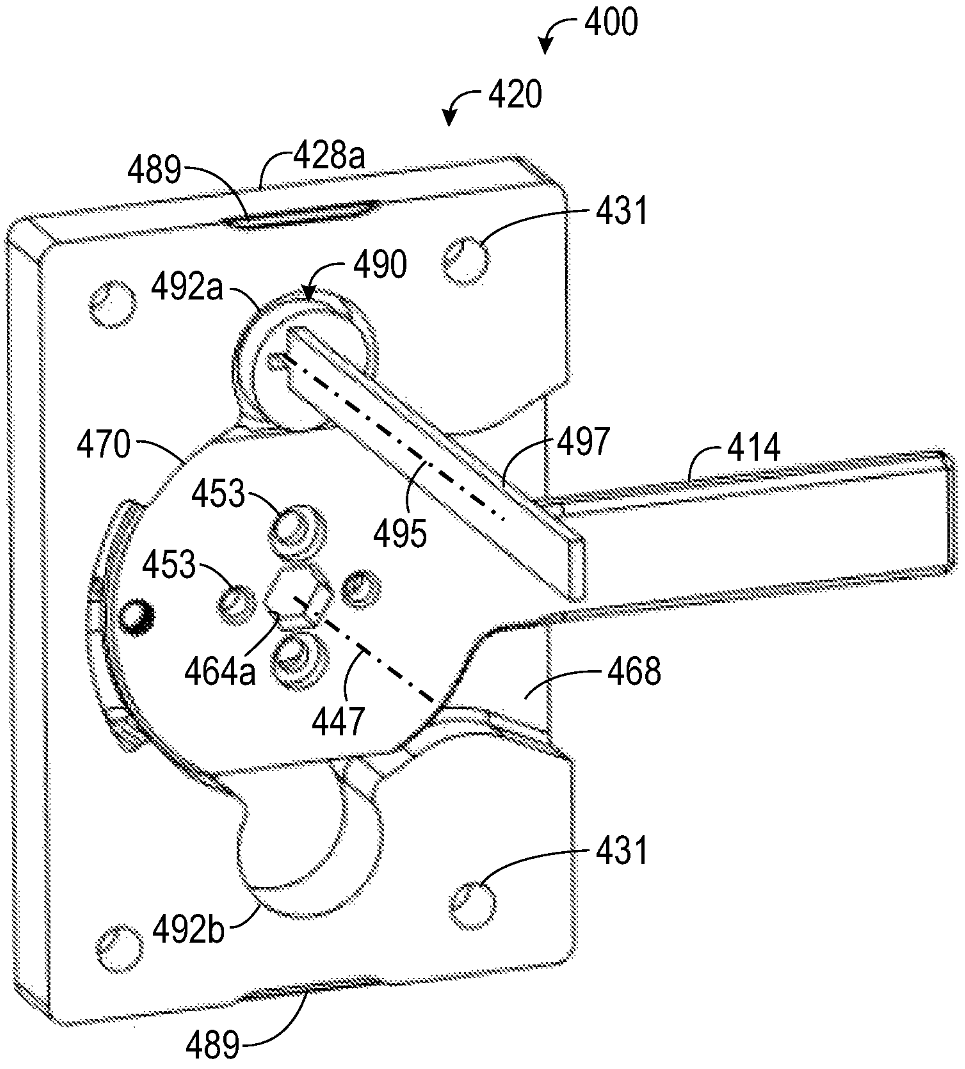
FIG. 23 is an inner side view of a latching assembly of yet another illustrative gate fastening device, with the gate fastening device including a modular lock device and a lock-coupling bar.

Latch 314 is configured to be rotated in opposite rotational directions from the closed, horizontal orientation of FIGS. 19 and 21. This capability allows support member 328*a* to be operatively mountable on left-hinged and right-hinged gates by inverting the support member. Biasing member 342 stores potential energy as latch 314 is rotated from the horizontal orientation in either direction by an applied torque, and uses this stored potential energy to drive latch 314 back to the horizontal orientation when the applied torque is removed. The biasing member has a first end 373 and a second end 375 each projecting from a body 387, which is located in groove 372 (see FIGS. 18, 20, and 22). A protrusion 376 of latch-side support 328*a*, and a shaft region of threaded member 378, are each positioned intermediate first end 373 and second end 375, with protrusion 376 radially offset from the shaft region of threaded member 378. When latch 314 is rotated from the horizontal orientation, one end of biasing member 342 is held stationary by engagement with protrusion 376 and the other end of biasing member 342 is engaged and travels with threaded member 378 of latch 314. If latch 314 is rotated clockwise with respect to latch-side support 328*a* in FIG. 19, first end 373 travels with latch 314 and second end 375 is held stationary by protrusion 376 (see FIG. 20). If latch 314 is rotated counterclockwise, second end 375 travels with latch 314 and first end 373 is held stationary by protrusion 376.

Latch-side cover 326*a* has the same general structure as described above for latch-side cover 226*a* of Subsection A, and is configured to cover outer surface 383 and lateral side walls of latch-side support 328*a* (see FIG. 18). However, latch-side cover 326*a* differs by being configured to be connected to latch-side support 328*a* by snap-fit attachment, which avoids the need for a separate fastener(s). Latch-side cover 326*a* has one or more first features 388 that are configured to fit together with one or more complementary second features 389 of latch-side support 328*a*. Elastic deformation of one or both of the latch-side cover 326*a* and the latch-side support 328*a* allows the complementary features to fit together, which attaches the cover to the latch-side support. In the depicted example, each first feature 388 is a protrusion and each second feature 389 is a recess, but in other examples, the first features include a protrusion and a recess and the second features include a recess and a protrusion, or the first features are recesses and the second features are protrusions, among others.

C. Lockable Gate Fastening Device

This subsection describes an illustrative gate fastening device 400 in which a latch 414 is lockable in a closed (e.g., horizontal) position using a lock device 490; see FIGS. 23-26.

Gate fastening device 400 has a latching assembly 420 including latch 414 pivotably coupled to a latch-side support 428*a*. The gate fastening device also may have an opposing assembly, covers for the assemblies, handles that attach to the assemblies, and a spindle that couples the assemblies to one another, as described above in Subsections A and B.

Latching assembly 420 is generally structured as described above for latching assembly 320 (see Subsection B). Latch 414 is pivotable in opposite directions from horizontal about a pivot axis 447 defined by a spindle, which couples latch 414 to an opposing assembly of the gate fastening device. The latch has a proximal portion 470 that defines holes 453 for coupling latch 414 to a handle, and also defines a hexagonal opening 464*a* through which a spindle extends (see FIG. 23; also see Subsections A and B). Proximal portion 470 has flats 491*a*, 491*b* located on opposite edge regions (see FIGS. 25 and 26). The flats are configured to be engaged by lock device 490, as described further below.

Latch-side support 428*a* includes various structures similar to those of latch-side support 328*a* (also see Subsection B). Support apertures 431 are configured to receive fasteners that mount the support onto a gate (see FIG. 23). A recess 468 formed in an inner surface of the support receives proximal portion 470 of latch 414. Snap-fit features 489 allow a cover with complementary snap-fit features to be attached over support 428*a* by snap-fit attachment. Unlike support 328*a*, support 428*a* also forms a pair of alternative receiving sites 492*a*, 492*b* for lock device 490. The receiving sites are adjacent recess 468 and are positioned respectively above and below pivot axis 447 of the latch. Lock device 490 is configured to be coupled to latch-side support 428*a* at either receiving site 492*a* or 492*b* selected by a user. This allows the lock device to be located above or below the latch, according to user preference, whether the gate is left-hinged or right-hinged.

Figure 24:
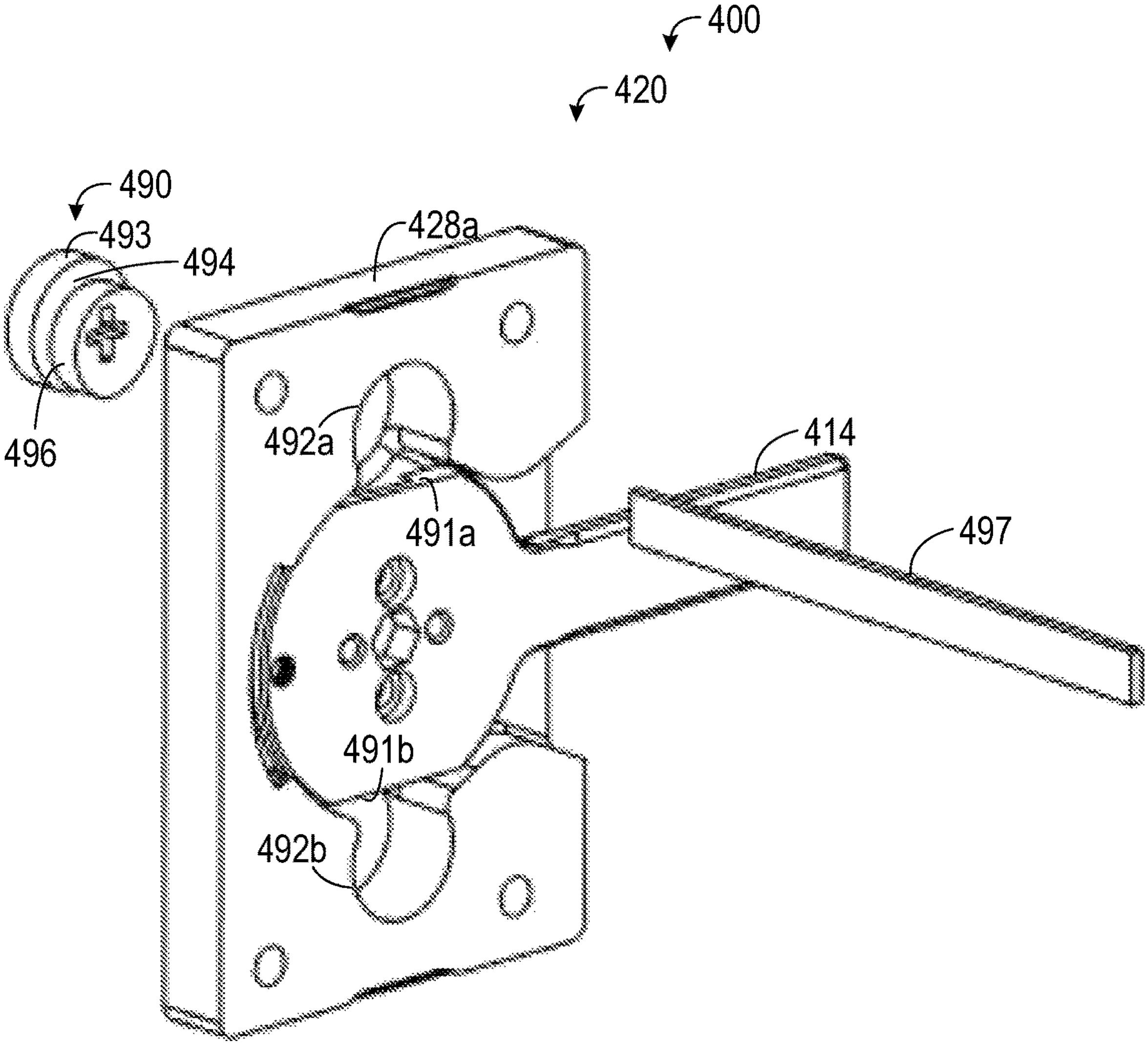
FIG. 24 is an exploded view of the latching assembly, the modular lock device, and the lock-coupling bar of FIG. 23.

Lock device 490 includes a frame 493 and a barrel 494 rotatably coupled to the frame (FIG. 24). The lock device is mounted to latch-side support 428*a* using frame 493, such that barrel 494 is rotatable with respect to the latch-side support. Barrel 494 forms a keyway for receiving a key inserted from the outer side of the barrel, which allows the barrel to be rotated about a lock pivot axis 495 by turning the inserted key (also see FIG. 23). Barrel 494 includes an obstructing portion 496 that is offset from lock pivot axis 495. In other examples, barrel 494 is configured to be rotated manually by a user, such as from the inner side of the gate, without the need for a separate key.

Figure 25:
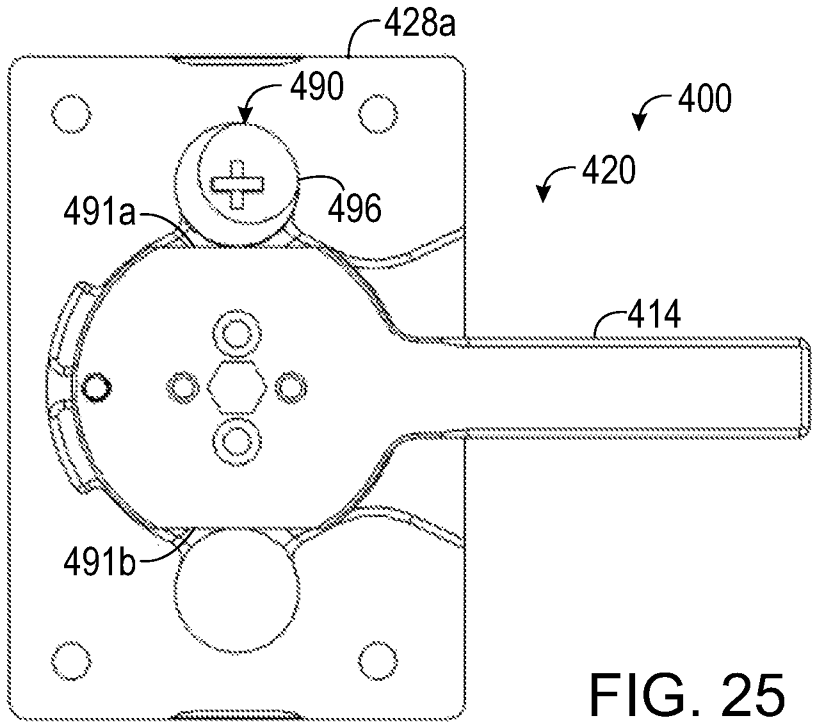
FIG. 25 is an elevation view of the latching assembly and the modular lock device of FIG. 23, taken at elevation with the modular lock device in an unlocked configuration that permits rotation of the latch.
Figure 26:
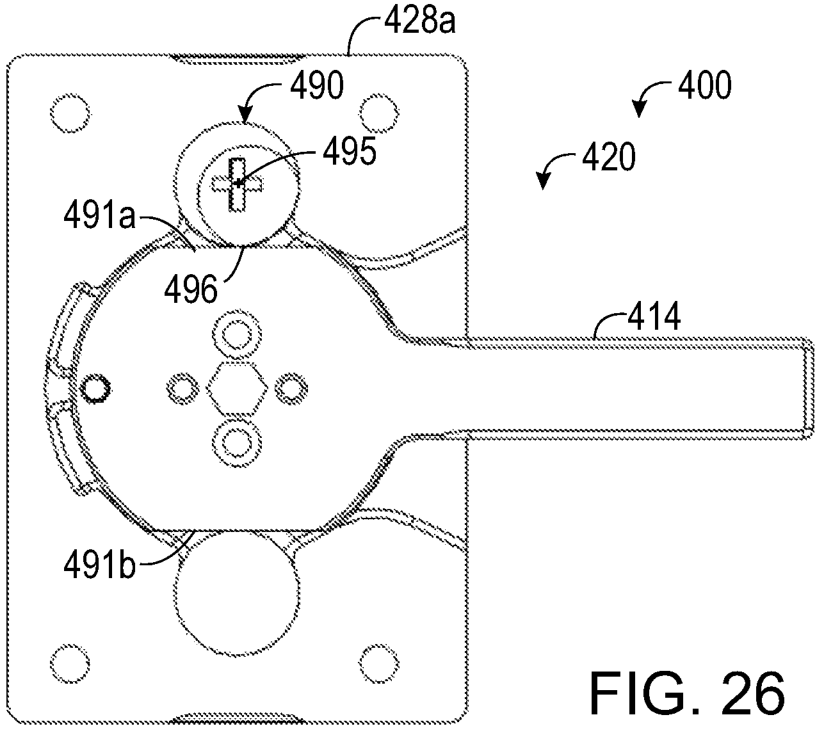
FIG. 26 is another elevation view of the latching assembly and the modular lock device of FIG. 23, taken at elevation as in FIG. 25, except with the modular lock device in a locked configuration that restricts rotation of the latch.

FIGS. 25 and 26 show latch 414 unlocked and locked. In FIG. 25, latch 414 is unlocked. Obstructing portion 496 is in a first position that is spaced from flat 491*a* of the latch and does not impede rotation of latch 414. In FIG. 26, latch 414 is locked. Obstructing portion 496 has been rotated about lock pivot axis 495 from the first position to a second position in which the obstructing portion is engaged with flat 491*a* of the latch, thereby restricting rotation of the latch from the closed position to an open position.

A coupling bar 497 is coaxial with lock pivot axis 495 and connected to lock device 490 such that barrel 494 and coupling bar 497 rotate together about the lock pivot axis (see FIGS. 23 and 24) Coupling bar 497 is configured to extend through the gate to a corresponding lock device of an opposing-side portion of the gate fastening device (also see Subsection A for further discussion of an opposing-side portion). This configuration allows the latch to be changed to a locked or unlocked from either side of the gate.

D. Handle with Graspable Knob

Figure 27:
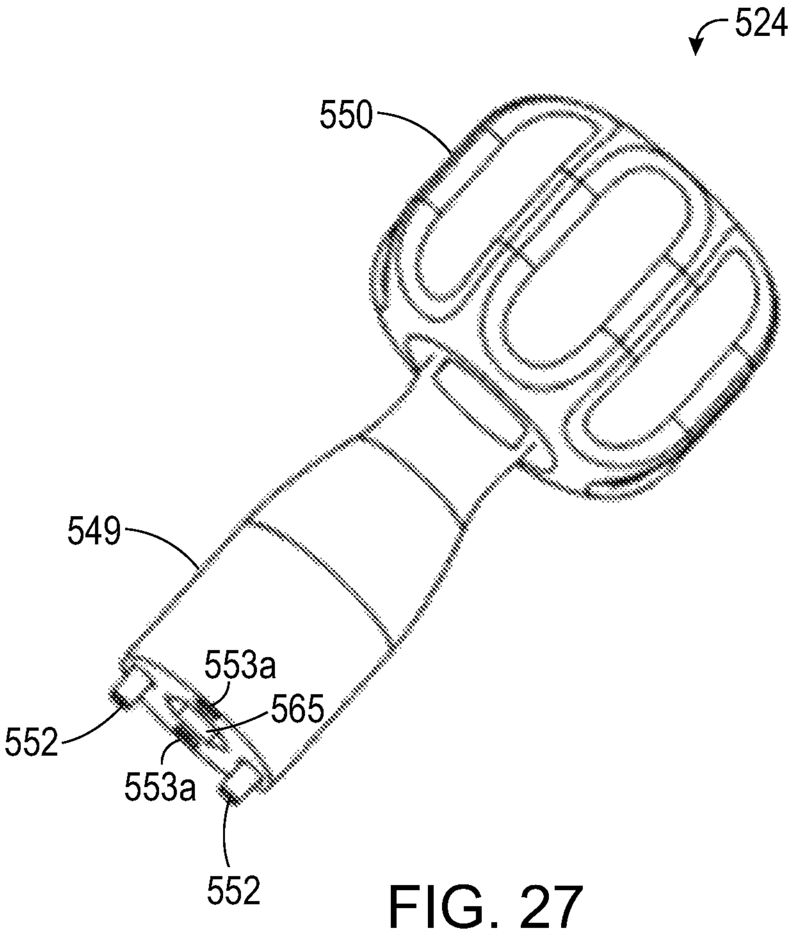
FIG. 27 is an isometric view of another illustrative handle for the latching assembly and/or the opposing assembly of any of the gate fastening devices of the present disclosure.

This subsection describes an illustrative handle 524 for incorporation into any of the gate fastening devices of the present disclosure; see FIG. 27.

Handle 524 has a base 549 and a graspable knob 550 that attaches to a distal end of the base. The proximal end of base 549 has the same structural features as the proximal end of base 249 (see Subsection A), including pins 552 and internally-threaded apertures 553*a* for mounting the handle onto a latch or pivotable member, and a hexagonal void 565 to receive an end of a hexagonal spindle. A user may be offered a choice of handles for the latch-side portion and the opposing-side portion of the gate fastening device, where each handle is configured to be alternatively mounted onto the latching assembly and the opposing assembly of the gate fastening device.

E. Snap-on Cover

Figure 28:
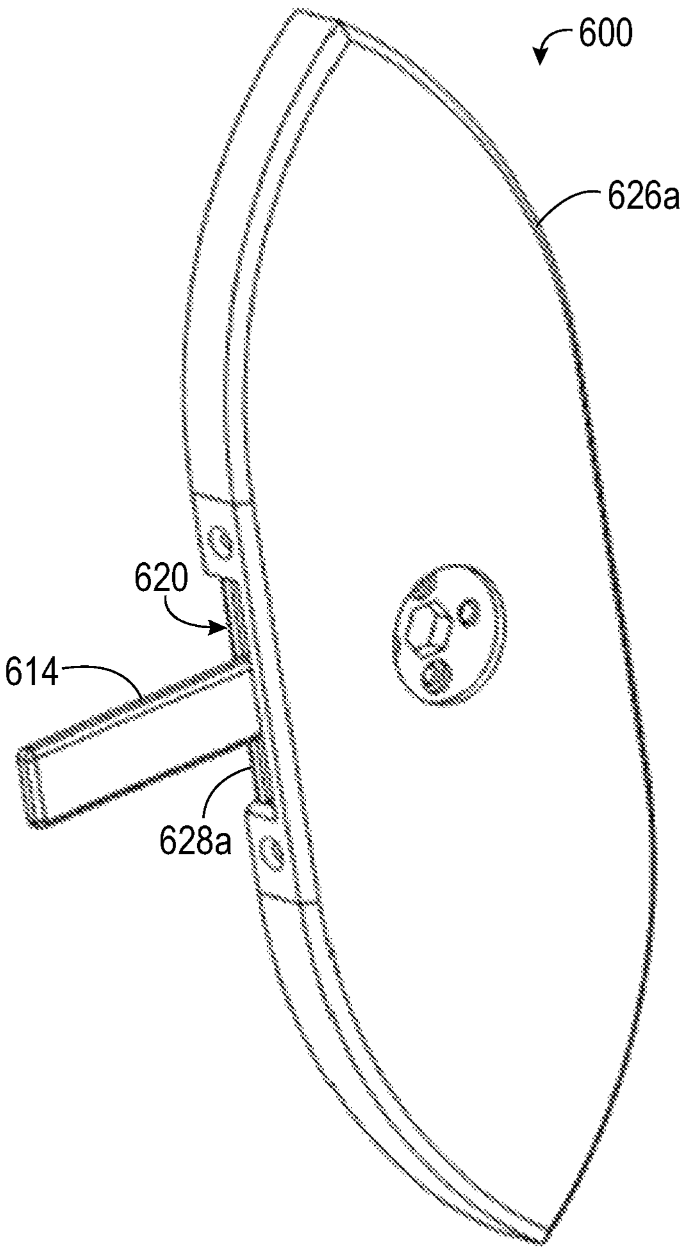
FIG. 28 is an axonometric view of an illustrative latching assembly and cover for incorporation into any of the gate fastening devices of the present disclosure, where the latching assembly and the cover assemble with one another by snap-fit attachment.
Figure 29:
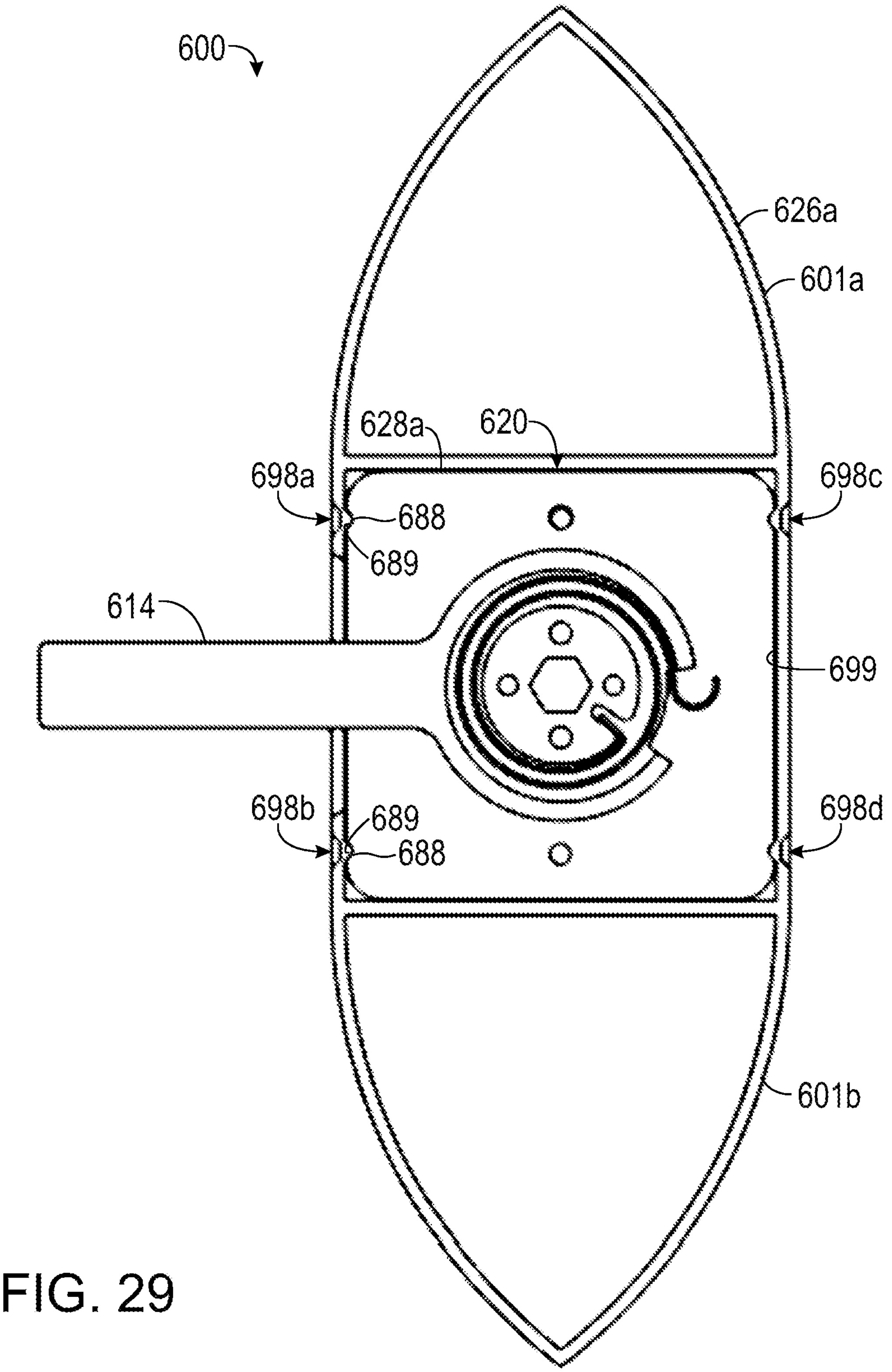
FIG. 29 is sectional view of the latching assembly and the cover of FIG. 28 showing the snap-fit attachment of the cover to a support of the latching assembly.

This subsection describes an illustrative cover 626*a* that snaps onto an illustrative latch-side support 628*a* of a gate fastening device 600; see FIGS. 28 and 29. Cover 626*a* is also suitable for placement onto an opposing-side support of any of the gate fastening devices described herein (e.g., see Subsections A-D and F).

FIG. 28 shows a latching assembly 620 of gate fastening device 600. Latching assembly 620 has a latch 614 pivotably coupled to latch-side support 628*a*, generally as described above in Subsection A. Cover 626*a* conceals most of the outer surface area of latching assembly 620 when latching assembly 620 is mounted on a gate.

FIG. 29 shows snap-fit attachment sites 698*a*-698*d* at which cover 626*a* and latch-side support 628*a* engage one another to lock cover 626*a* onto latch-side support 628*a*. Each attachment site 698*a*-698*d* has a pair of complementary snap-fit features 688, 689 formed respectively by cover 626*a* and latch-side support 628*a*. In the depicted example, cover snap-fit features 688 are protrusions and support snap-fit features 689 are depressions. However, in other examples the positions of any of the protrusions and depressions may be switched. Four attachment sites 698*a*-698*d* are used in the depicted example, but in other examples any number of one or more snap-fit attachment sites may be sufficient to lock the cover onto the support.

Cover 626*a* has a different perimeter shape than latch-side support 628*a* in a vertical plane. The cover has a front wall and lateral walls that collectively define a void 699, which is sized and shaped in correspondence with latch-side support 628*a*. Cover 626*a* also has extensions 601*a*, 601*b* located above and below void 699.

F. Gate Fastening Device with Additional Features

This subsection describes another illustrative gate fastening device 700; see FIGS. 30-37. Device 700 shares many features with previous embodiments, including an invertible mount, an adjustable spacing member to allow the device to accommodate various gate thicknesses, and a cover, among others. Device 700 also has additional features, including tapered counterbores to reduce fastener backout, additional apertures for receiving fasteners, and complementary compliant and noncompliant snap-fit features for securing a cover. Exemplary shared and additional features are described below.

Figure 30:
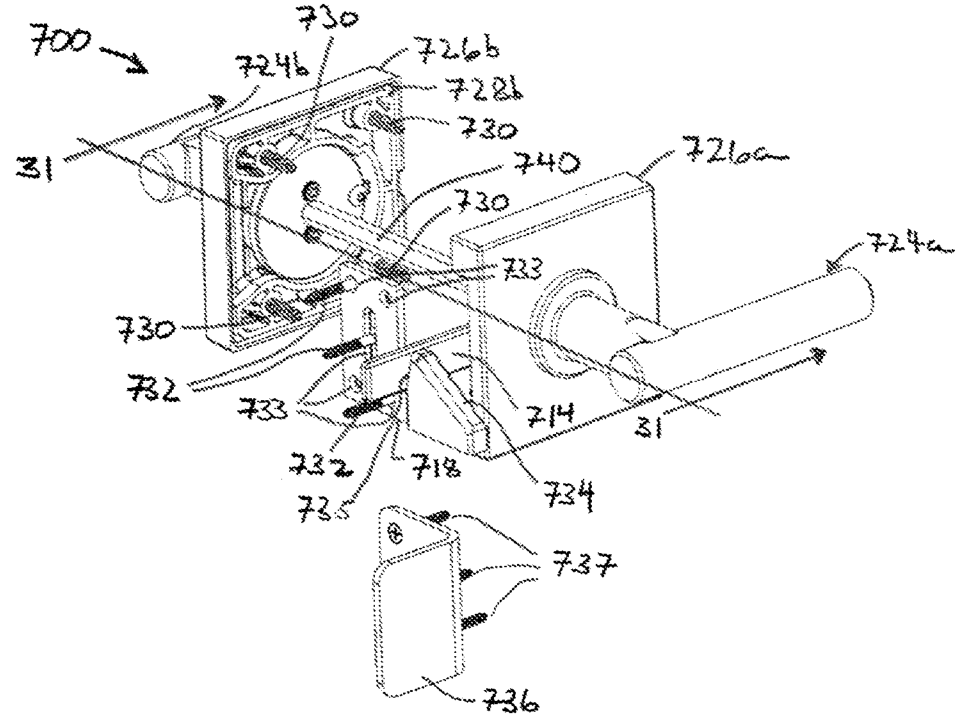
FIG. 30 is an isometric view of yet another illustrative gate fastening device that is adaptable to accommodate different gate configurations and user needs.
Figure 31:
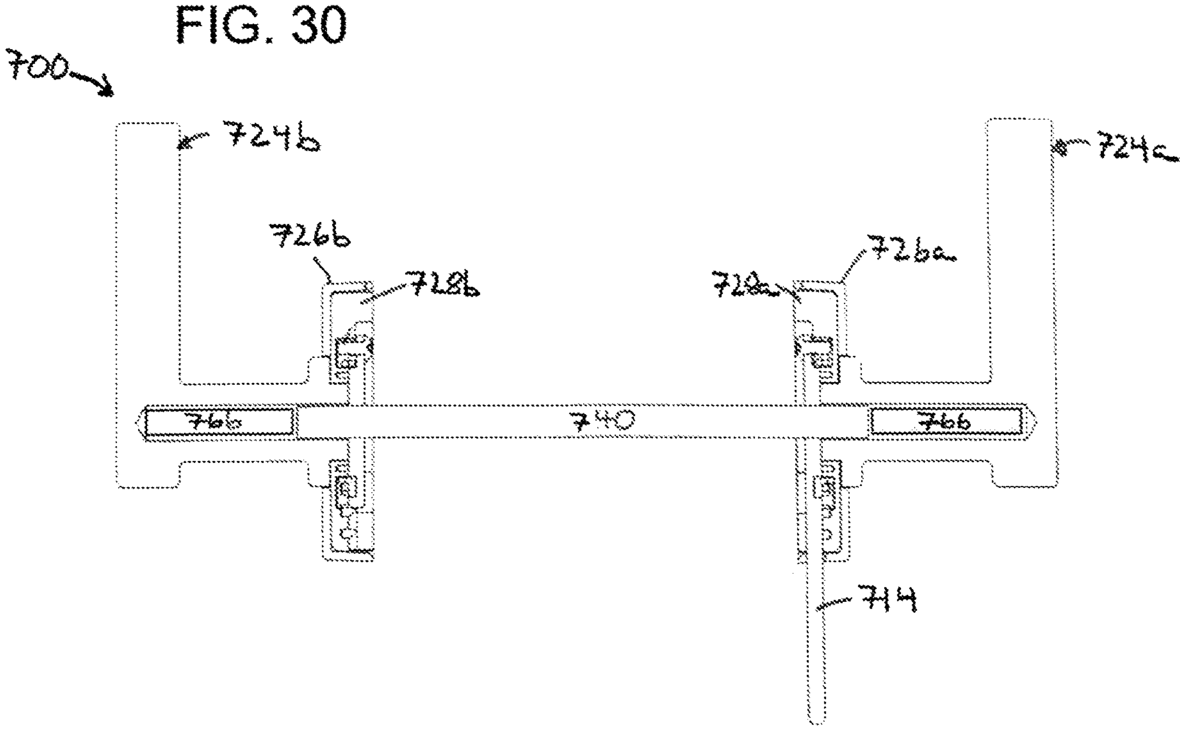
FIG. 31 is a cross-sectional top view of the gate fastening device of FIG. 30, taken generally along line 31-31 of FIG. 30, with the catch, stop, and selected fasteners removed.

FIGS. 30 and 31 show isometric and cross-sectional top views of device 700. The device includes most or all of the features described in connection with previous embodiments. These features include a latch 714, a catch 718, latch-side and opposing-side handles 724*a* and 724*b*, latch-side and opposing-side covers 726*a* and 726*b*, latch-side and opposing-side supports, support fasteners 730, support apertures 731, a gate stop 736, a spindle 740, and inserts 766. The handles, in turn, may be integral or formed from subcomponents. Catch 718, in turn, may include catch fasteners 732 selected to fit associated catch apertures 733. Stop 736, in turn, may include associated stop fasteners 737 selected to fit associated stop apertures (visible, for example, at the top left of the stop). Further features, such as biasing members, are also present. The support serves as a bearing surface between the handle and latch. Components of device 700 (and other devices described herein) may be formed of any suitable materials. For example, components such as supports 728*a* and 728*b* may be formed of a compliant material, such as plastic, while components such as latch 714, catch 718, covers 726*a* and 726*b*, spindle 740, and stop 736, as well as various fasteners, may be formed of a noncompliant material, such as metal. These material choices may facilitate function of the device. For example, each support 728*a,b*, which secures the assembly to the gate, is captured by handle 724*a,b* and spindle 714, which are fixed together, so that the handle and spindle articulate as one with their motion restricted to rotation relative to support 728*a,b*. In particular, support 728*a,b*, being compliant (e.g., plastic), provides a beneficial bearing surface with the noncompliant (e.g., metal) handle and spindle.

Figure 32:
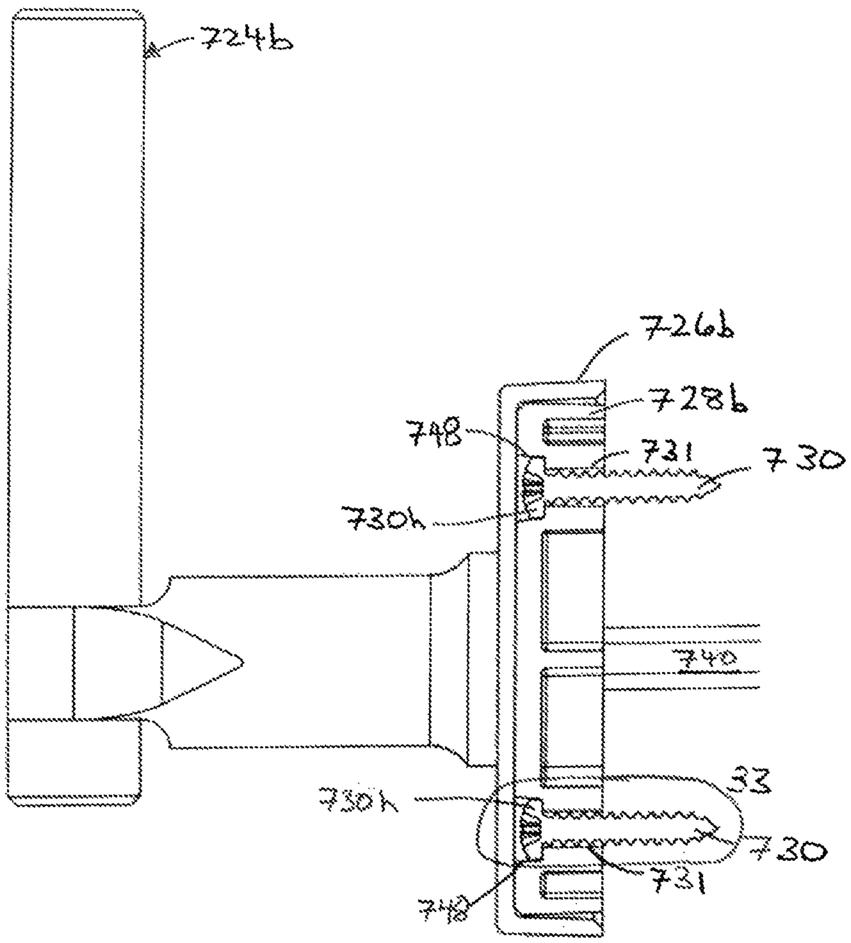
FIG. 32 is a cross-sectional top view of an opposing-side portion of the gate fastening device of FIG. 30 showing, among other aspects, tapered counterbores used to reduce fastener backout.
Figure 33:
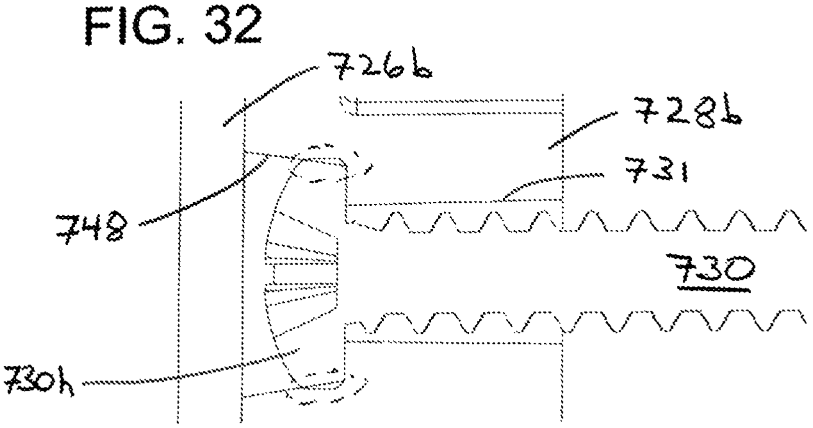
FIG. 33 is an enlarged view of a portion of the gate fastening device of FIG. 32, taken generally from oval 33 in FIG. 32, showing details of the tapered counterbore.

FIGS. 32 and 33 show details of an opposing-side portion of device 700. The details include how support fasteners 730 fit through support apertures 731 in support 728*b* to attach the portion to a gate (not shown). The apertures include tapered counterbores for receiving a head 730*h* of support fasteners 730. This causes a locking effect that reduces or eliminates screw backout while allowing for compression of the support against the gate during installation. The locking may be further facilitated by using noncompliant fasteners, such as metal fasteners, with a compliant support, such as a plastic support, allowing the fasteners to grippingly deform the support during engagement (see, e.g., dashed ovals in FIG. 33 and/or interference fits). These features address a significant problem with existing gate fastening devices: screw backout from vibration caused by repeated opening and closing of the gate. The same tapered counterbores and choice(s) of materials may be used in the latch-side portion of device 700.

Figure 34:
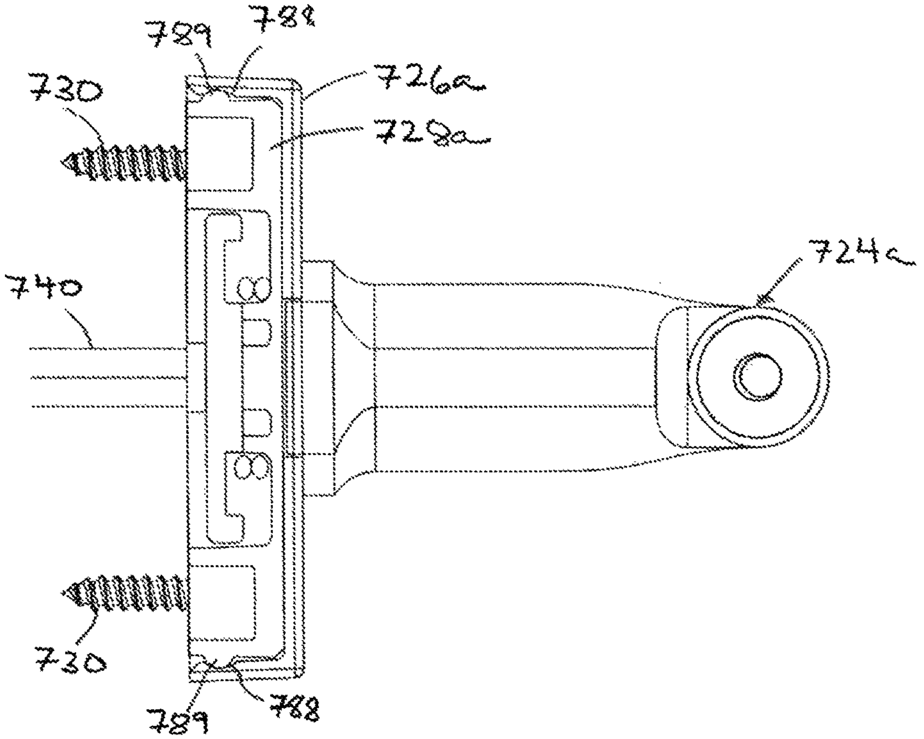
FIG. 34 is a cross-sectional side-view of a latch-side portion of the gate fastening device of FIG. 30 showing, among other aspects, snap-fit features for securing a cover to a support member.
Figure 35:
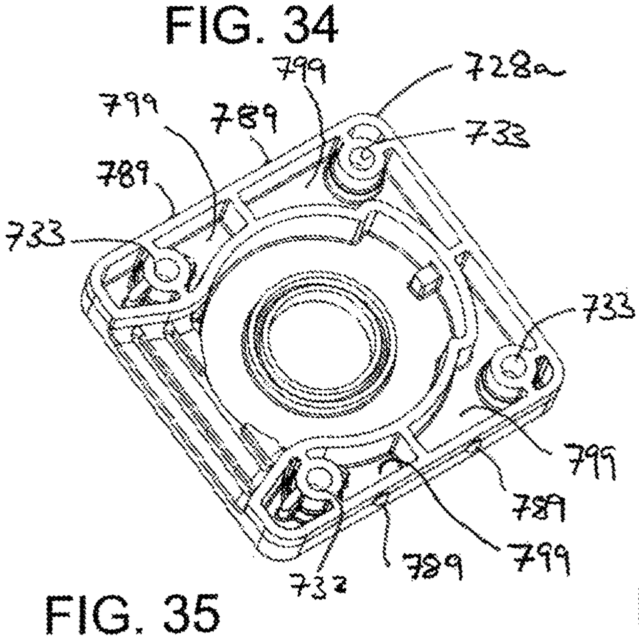
FIG. 35 is an isometric view of a support member for a latch-side portion of the gate fastening device of FIG. 30 showing, among other aspects, nubs on a support member that mate up with corresponding recesses on a cover to secure the cover to the support member.
Figure 36:
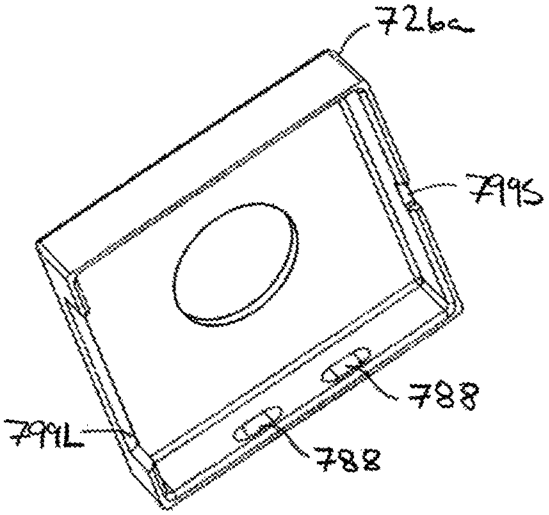
FIG. 36 is an isometric view of a cover for the support member of FIG. 35, showing, among other aspects, recesses on a cover that mate up with corresponding nubs on a support member, such as the support member in FIG. 35, to secure the cover to the support member.

FIGS. 34-36 show details of a latch-side portion of device 700. The details include an interplay between mechanical design and material choices that facilitate the snap-fit attachment of cover 726*a* to underlying support 728*a*. The mechanical design includes protrusions, such as nubs 789, on an outside surface of the support that mate with corresponding indentations, such as recesses 788, on an inside surface of the cover. In other cases, protrusions and indentations may be reversed or mixed (with a combination of protrusions and indentations on both support and cover). Here, the support is compliant, and the cover is noncompliant. The support further includes interior voids 799 such that the support can flex inward to allow the cover to pass over the nubs and then spring back outward such that the nubs engage the recesses in the cover. Together, these features snap and lock the cover onto the housing. In addition to facilitating flexion, the interior voids also reduce material requirements and enable production by injection molding. The cover may include a large notch 799L to accommodate the latch and a smaller notch 799S to allow placement of a tool, such as a flat head screwdriver, after installation. The cover can then be pried off to allow access to the fasteners if the latch needs to be removed. The same mechanical features and choice(s) of materials may be used with the opposing-side portion of device 700.

Figure 37:
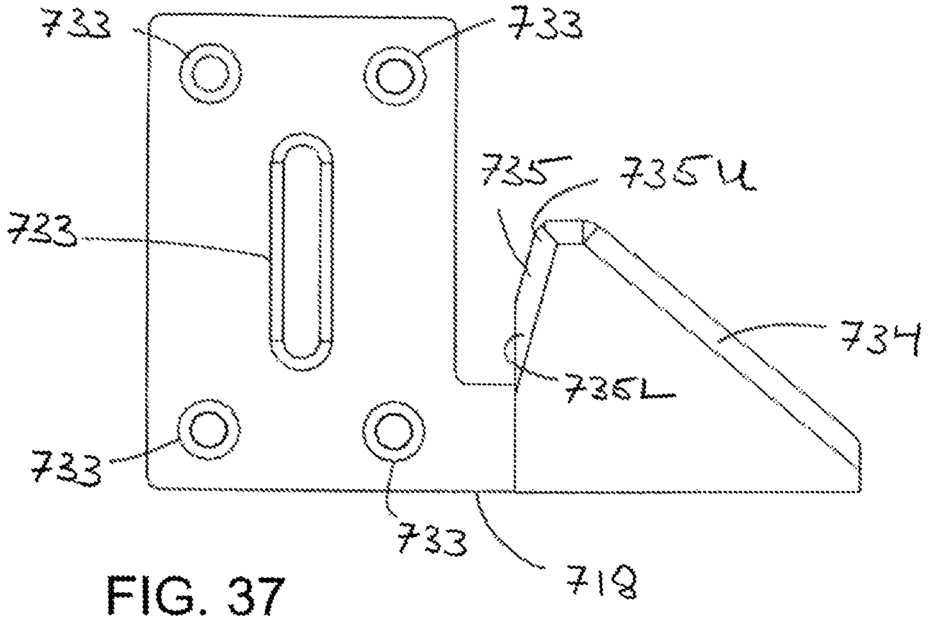
FIG. 37 is a side view of a catch from the gate fastening device of FIG. 30, showing details of a ramp and opening used by the catch to capture and secure a latch.

FIG. 37 shows details of latch catch 718 of device 700. The catch may include several interesting features. The catch itself may be formed of a noncompliant material, such as metal. A cap formed of a more compliant material, such as plastic, may optionally be affixed to the metal catch to dampen the impact of the latch against the catch. This, in turn, may both quiet the impact and protect the finish on the latch. The catch may include a ramp 734 for lifting the latch during gate closure and a slot 735 for receiving and holding the latch when the gate is closed. The slot may be asymmetric, with an angled top. In particular, an upper surface 735U of the slot may be set closer to ramp 734 than a lower surface 735L of the slot, creating a larger opening at the top of the slot that allows the latch to be more easily caught, while creating a narrower opening at the bottom that may reduce vibration or rattle caused by the wind, motor vehicle rumbling, and the like. The catch includes catch apertures 733 for receiving catch fasteners (see FIG. 30) for attaching the catch to a fence. The apertures may be circular or elongate. Here, a middle aperture forms an elongate slot which allows placement of a first fastener that can be used to adjust the up and down position of the catch. Once a preferred position is determined, additional fasteners can be added using additional (e.g., circular) apertures. The catch may include more apertures than are needed, such that some are left empty. In this case, if the gate sags, moves, or swells at a later date, and the catch needs to be adjusted, the fasteners in the circular apertures can be removed, and the slot fastener can be loosened and the height can be adjusted. Then, the slot fastener can be retightened and fasteners can be added in the original apertures and/or one or more of the originally unused apertures. Because these adjustments can be minor, it may be difficult to insert fasteners into the original circular apertures because the old holes may be close, preventing good purchase or causing the fastener to be redirected into the old hole. In these cases, the extra holes are available to access ideal purchase in wood that does not contain a nearby fastener hole. The catch may be symmetrical so that it can be installed on the left or the right depending on the gate swing. The gate stop (see FIG. 30) may have a similar slot aperture, but in this case oriented horizontally to improve ease of installation and allow for incremental adjustment, plus additional circular apertures.

Illustrative Combinations and Additional Examples

This section describes additional aspects and features of the devices and methods of the present disclosure, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A1. A gate fastening device, comprising: a latching assembly including a latch pivotably coupled to a first support that mounts on a gate; an opposing assembly including a pivotable member coupled to a second support that mounts on the gate opposite the first support; a spindle to couple the latch and the pivotable member to one another through the gate for rotation as a unit; a handle including a base and a grip, the base being attached, or configured to be attached, to the latch; and a cover configured to be placed onto the first support and around the base of the handle.

A2. The fastening device of paragraph A1, further comprising a securing member configured to secure the cover to the first support.

A3. The fastening device of paragraph A2, wherein the securing member is configured to be placed around the base of the handle and into threaded engagement with the first support.

A4. The fastening device of paragraph A2 or A3, wherein the securing member has a body defining an opening having a diameter corresponding to a diameter of the base of the handle, and wherein the securing member also has a flange projecting from the body and configured to engage the cover.

A5. The fastening device of any of paragraphs A1 to A4, wherein the cover is configured to be secured to the first support by complementary snap-fit features of the cover and the first support.

A5A. The fastening device of paragraph A5, wherein the cover is formed of a noncompliant material, such as metal, and the first support is formed of a compliant material, such as plastic.

A5A1. The fastening device of paragraph A5, wherein the support includes interior voids that allow the support to flex inward during attachment of the cover.

A5A2. The fastening device of any of paragraphs A1 to A5A1, wherein the supports further include tapered counterbores for receiving fasteners to attach the device to a gate.

A6. The fastening device of any of paragraphs A1 to A5A2, wherein the first support defines apertures to receive fasteners that mount the first support on the gate, and wherein the cover is configured to hide the apertures and/or the fasteners received by the apertures.

A7. The fastening device of any of paragraphs A1 to A6, wherein the first support has an outer surface, and wherein the cover is configured to extend completely across the outer surface.

A8. The fastening device of paragraph A7, wherein the cover is configured to conceal the outer surface of the first support.

A9. The fastening device of any of paragraphs A1 to A8, wherein the handle is a first handle and the cover is a first cover, the device further comprising: a second handle including a base and a grip, the base of the second handle being attached, or configured to be attached, to the pivotable member; and a second cover for the second support.

A10. The fastening device of any of paragraphs A1 to A9, wherein the grip is formed separately from the base of the handle, and wherein the grip is fastened, or configured to be fastened, to the base.

A11. The fastening device of paragraph A10, wherein the cover is configured to be placed onto the first support and around the base of the handle after the first support has been mounted on the gate with fasteners and before the grip is fastened to the base of the handle.

A12. The fastening device of any of paragraphs A1 to A11, further comprising a lock device configured to be coupled to the first support and adjustable between a first configuration to permit rotation of the latch and a second configuration to restrict rotation of the latch.

A13. The fastening device of paragraph A12, wherein the latch has a proximal portion and a distal portion, wherein a pivot axis of the latch extends through the proximal portion, and wherein the lock device is configured to engage an edge region of the proximal portion of the latch in the second configuration.

A14. The fastening device of paragraph A12 or A13, wherein the lock device is a first lock device, further comprising: a second lock device configured to be coupled to the second support; and a coupling bar configured to couple adjustment of the first lock device and the second lock device to one another.

A15. The fastening device of any of paragraphs A12 to A14, wherein the first support defines a pair of alternative receiving sites for the lock device, and wherein the pair of alternative receiving sites are spaced from one another.

A16. The fastening device of paragraph A15, wherein the pair of alternative receiving sites are configured to be located respectively above and below a pivot axis of the latch.

A17. The fastening device of any of paragraphs A1 to A16, wherein the latching assembly has an inner surface, and wherein the latching assembly is configured to be alternatively mounted on a left-hinged gate or a right-hinged gate with the inner surface facing the left-hinged gate or the right-hinged gate and with the latching assembly inverted on the right-hinged gate relative to the left-hinged gate.

A18. The fastening device of any of paragraphs A1 to A17, wherein the latch has a closed position and is rotatable from the closed position in opposite rotational directions, and wherein the latching assembly includes a biasing member configured to urge the latch back to the closed position when the latch is rotated away from the closed position in either of the opposite rotational directions.

A19. The fastening device of paragraph A18, wherein the latch includes a bar, and wherein an axis of the bar is configured to be horizontal in the closed position.

A20. The fastening device of any of paragraphs A1 to A19, further comprising a catch configured to engage the latch to hold the gate closed.

A21. The fastening device of paragraph A20, wherein the catch includes a slot to hold the latch, wherein the slot is wider at the top to facilitate capture of the latch and narrower at the bottom to reduce movement (and optionally any associated vibration) of the latch when it is captured within the slot.

A22. The fastening device of paragraph A20 or A21, wherein the catch further includes a compliant (e.g., plastic) cap that fits over at least a portion of the catch that engages the latch.

A23. The fastening device of any of paragraphs A1 to A22, further comprising a gate stop configured to attach to the fence.

A24. The fastening device of paragraph A23, wherein the catch includes an elongate vertical aperture for receiving a catch fastener and/or the gate stop includes an elongate horizontal aperture for receiving a stop fastener, the elongate apertures allowing provisional placement of fasteners while the catch and/or gate stop are being mounted.

A25. The fastening device of any of paragraphs A1 to A24, wherein the cover may be mounted by fitting it over the complete handle.

A26. The fastening device of any of paragraphs A1 to A25, the support being compliant, the handle and spindle being noncompliant, wherein the support provides a bearing surface for the combination of the handle and spindle.

A27. The fastening device of any of paragraphs A1 to A26, further comprising any limitation or combination of limitations of paragraphs B1 to B10, C1 to C17, and D1.

B1. A method of installing a gate fastening device, the method comprising: mounting a latching assembly on the gate, the latching assembly including a latch pivotably coupled to a first support; mounting an opposing assembly on the gate opposite the first support, the opposing assembly including a pivotable member coupled to a second support; coupling the latch and the pivotable member to one another through the gate for rotation as a unit; attaching a base of a handle to the latch; and placing a cover onto the first support and around the base of the handle.

B2. The method of paragraph B1, wherein mounting the latching assembly includes attaching the first support to the gate using fasteners received in apertures defined by the first support, and wherein mounting the opposing assembly includes attaching the second support to the gate using fasteners received in apertures defined by the second support.

B3. The method of paragraph B1 or B2, the handle being a first handle, the method further comprising attaching a base of a second handle to the pivotable member.

B4. The method of paragraph B3, wherein each of the first handle and the second handle defines a void, and wherein coupling includes placing opposite ends of a spindle into the void of the first handle and the void of the second handle.

B5. The method of any of paragraphs B1 to B4, wherein attaching the base of the handle to the latch includes mounting the base of the handle onto the latch using one or more fasteners.

B6. The method of any of paragraphs B1 to B5, further comprising fastening a grip of the handle to the base of the handle.

B7. The method of paragraph B6, wherein fastening the grip is performed after placing the cover onto the first support and around the base of the handle.

B8. The method of any of paragraphs B1 to B7, further comprising securing the cover to the first support.

B9. The method of paragraph B8, wherein securing the cover includes attaching the cover to the first support using one or more fasteners.

B10. The method of paragraph B9, wherein attaching the cover includes engaging complementary snap-fit features of the cover and the first support with one another.

B11. The method of any of paragraphs B1 to B10, further comprising mounting a catch to a fence adjacent the gate fastening device using fasteners, such that the latch engages with the catch to hold the gate closed.

B12. The method of paragraph B11, the catch including a combination of elongate and circular apertures for receiving the fasteners, wherein the step of mounting the catch includes placing a fastener into the elongate aperture, moving the catch to a desired height, then securing the catch by tightening the fastener in the elongate aperture and placing additional fasteners some or all of the circular apertures.

B13. The method of paragraph B12, further comprising removing the fasteners in the circular apertures, loosening the fastener in the elongate aperture, adjusting a height of the catch, then securing the catch in a new position by tightening the fastener in the elongate aperture and placing at least one fastener in an aperture not already used during the initial placement.

B14. The method of any of paragraphs B1 to B13, further comprising mounting a gate stop to a fence adjacent the gate using fasteners, wherein the gate stop has a combination of elongate and circular apertures for receiving the fasteners, wherein the stop of mounting the stop includes placing a fastener into the elongate aperture, moving the stop to a desired position, then securing the stop by tightening the fastener in the elongate aperture and placing additional fasteners some or all of the circular apertures.

B15. The method of any of paragraphs B1 to B14, further comprising any limitation or combination of limitations of paragraphs A1 to A27, C1 to C17, and D1

C1. A gate fastening device, comprising: a latching assembly having a front side opposite a back side and including a latch pivotably coupled to a support, the latching assembly being configured to be operatively mountable on a left-hinged gate with the front side of the latching assembly facing the left-hinged gate and operatively mountable on a right-hinged gate with the back side of the latching assembly facing the right-hinged gate; and a pair of handles each configured to be operatively coupled to the latch and respectively located on opposite sides of the left-hinged gate or the right-hinged gate, wherein one of the handles is configured to be mounted onto the back side of the latching assembly for the left-hinged gate and onto the front side of the latching assembly for the right-hinged gate.

C2. The fastening device of paragraph C1, wherein the latch includes a proximal portion located inside the support and a distal portion that projects out of the support from the proximal portion, and wherein the support includes a first copy and a second copy of a same structural member that are attached to one another to create a holder for the proximal portion of the latch.

C3. The fastening device of paragraph C2, wherein the support has a pair of opposites surfaces that are spaced from one another parallel to a pivot axis of the latch, and wherein the first copy forms one of the opposite faces and the second copy forms the other of the opposite faces.

C4. The fastening device of any of paragraphs C1 to C3, wherein the support has a pair of opposites surfaces, further comprising a cover configured to be disposed on one of the opposite surfaces of the support when the front side of the latching assembly is facing the left-hinged gate and disposed on the other of the opposite surfaces of the support when the back side of the latching assembly is facing the right-hinged gate.

C5. The fastening device of paragraph C4, wherein the support defines a plurality of apertures configured to receive fasteners for mounting the support onto the left-hinged or right-hinged gate, further comprising a cover configured to hide each of the plurality of apertures.

C6. The fastening device of paragraph C5, wherein each aperture has opposite ends and is enlarged in diameter at both of the opposite ends to receive a head of one of the fasteners at either of the opposite ends.

C7. The fastening device of paragraph C5 or C6, further comprising a securing member configured to secure the cover to the support while encircling a region of the handle.

C8. The fastening device of paragraph C7, wherein the securing member is configured to be disposed in threaded engagement with the support.

C9. The fastening device of paragraph C5 or C6, wherein the cover is configured to be secured to the support by snap-fit attachment.

C10. The fastening device of any of paragraphs C1 to C9, wherein the one of the handles includes a base and a grip formed separately from one another, wherein the base is configured to be mounted onto the latch, and wherein the grip is fastened, or configured to be fastened, to the base.

C11. The fastening device of any of paragraphs C1 to C10, the support being a first support, the fastening device further comprising: an opposing assembly including a pivotable member coupled to a second support, the second support being configured to be mounted on the left-hinged or right-hinged gate opposite the first support; and a spindle defining an axis and configured to transmit torque between the latching assembly and the opposing assembly, such that turning the one of the handles about the axis causes the other of the handles to turn about the axis, and vice versa.

C12. The fastening device of paragraph C11, wherein each of the first support and the second support includes two copies of a structural member that are attached to one another to form a holder for the latch or the pivotable member.

C13. The fastening device of paragraph C11 or C12, wherein each handle of the pair of handles defines a void, and wherein the spindle is configured to extend into the void of each handle.

C14. The fastening device of paragraph C13, further comprising an insert configured to be cut to an appropriate length and placed into the void of one of the handles before the spindle extends into the void of the one of the handles, to limit axial travel of the spindle.

C15. The fastening device of any of paragraphs C1 to C14, wherein the latching assembly includes a biasing member configured to urge the latch toward a closed position from an open position.

C16. The fastening device of any of paragraphs C1 to C15, wherein the latch has an open position and is configured to be angled upward in the open position whether the latching assembly is operatively mounted to the left-hinged gate or the right-hinged gate.

C17. The fastening device of any of paragraphs C1 to C16, further comprising a catch configured to be mounted to a barrier adjacent the left-hinged or right hinged gate and to interface with the latch such that the gate is fastened shut.

C18. The fastening device of any of paragraphs C1 to C17, further comprising any limitation or combination of limitations of paragraphs A1 to A27, B1 to B15, and D1

D1. A method of installing a fastening device on a gate, the fastening device including a latching assembly having a front side opposite a back side and including a latch pivotably coupled to a support, the method comprising: mounting the fastening device such that the front side of the latching assembly faces the gate if the gate is left-hinged and such that the back side of the latching assembly faces the gate if the gate is right-hinged; and mounting a handle to the latch on the back side of the latching assembly if the gate is left-hinged or on the front side of the latching assembly if the gate is right-hinged.

D2. The method of paragraph D1, further comprising any limitation or combination of limitations of paragraphs A1 to A27, B1 to B15, and C1 to C17.

Advantages, Features, and Benefits

The different examples of a gate fastening device, and associated methods described herein, provide several advantages over known solutions. For example, illustrative examples described herein provide gate fastening devices that are more versatile, modular, and/or customizable to meet user needs and preferences.

Additionally, and among other benefits, illustrative examples described herein provide gate fastening devices that are alternatively mountable on a left-hinged gate and a right-hinged gate and methods of installing the gate fastening devices on these gates.

Additionally, and among other benefits, illustrative examples described herein provide a gate fastening device having any of the following: a cover(s) (e.g., a snap-on cover) that fits over a support, a latch rotatable against the restoring force of a biasing member in opposite directions from a closed position, a modular handle(s), manual adjustment of latch position from opposite sides of the gate, a lock device(s) for the latch, a support that alternatively receives a lock in two different sites, and/or a support formed by two copies of a structural member, among others.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A gate fastening device, comprising:

a latching assembly including a latch pivotably coupled to a first support that mounts on a first outside surface of a gate;

a pivotable member assembly including a pivotable member coupled to a second support that mounts on a second outside surface of the gate opposite the first support;

a spindle to couple the latch and the pivotable member to one another through the gate for rotation as a unit;

a handle including a base and a grip, the base being attached, or configured to be attached, to the latch;

a cover configured to be placed onto the first support and around the base of the handle after the first support has been mounted on the gate; and a catch configured to be mounted to a barrier adjacent the left-hinged or right-hinged gate and to interface with the latch such that the gate is fastened shut;

wherein the first support defines support apertures to receive support fasteners that mount the first support on the gate, and wherein the cover is configured to hide the support apertures and support fasteners received by the support apertures.

2. The fastening device of claim 1, wherein the cover is configured to be secured to the first support by complementary snap-fit features of the cover and the first support.

3. The fastening device of claim 1, wherein the first support has an outer surface, and wherein the cover is configured to extend completely across and conceal the outer surface.

4. The fastening device of claim 1, wherein the handle is a first handle and the cover is a first cover, the fastening device further comprising:

a second handle including a base and a grip, the base of the second handle being attached, or configured to be attached, to the pivotable member; and a second cover for the second support.

5. The fastening device of claim 1, further comprising a lock device configured to be coupled to the first support and adjustable between a first configuration to permit rotation of the latch and a second configuration to restrict rotation of the latch.

6. The fastening device of claim 5, wherein the latch has a proximal portion and a distal portion that projects out of the first support, wherein a pivot axis of the latch extends through the proximal portion, and wherein the lock device is configured to engage an edge region of the proximal portion of the latch in the second configuration.

7. The fastening device of claim 5, wherein the lock device is a first lock device, further comprising:

a second lock device configured to be coupled to the second support; and a coupling bar configured to couple adjustment of the first lock device and the second lock device to one another.

8. The fastening device of claim 5, wherein the first support defines a pair of alternative receiving sites for the lock device, and wherein the pair of alternative receiving sites are spaced from one another.

9. The fastening device of claim 8, wherein the pair of alternative receiving sites are configured to be located respectively above or below a pivot axis of the latch.

10. The fastening device of claim 1, wherein the latch has a closed position and is rotatable from the closed position in opposite rotational directions, and wherein the latching assembly includes a biasing member configured to urge the latch back to the closed position when the latch is rotated away from the closed position in either of the opposite rotational directions.

11. The fastening device of claim 1, wherein the catch includes a vertically oriented elongate aperture, for placement of a first catch fastener, that can be used to adjust the up and down position of the catch while the catch is being mounted or adjusted.

12. The fastening device of claim 11, wherein the catch includes a slot having a top and a bottom to hold the latch, and wherein the slot is wider at the top to facilitate capture of the latch and narrower at the bottom to reduce movement of the latch when it is captured within the slot.

13. The fastening device of claim 1, further comprising a gate stop configured to be mounted to the gate and extending out to a barrier such that the range of gate rotation is fixed for the closed position.

14. The fastening device of claim 13, wherein the gate stop includes a horizontally oriented elongate aperture, for placement of a gate stop fastener, that can be used to adjust the horizontal position of the gate stop while the gate stop is being mounted or adjusted.

15. The fastening device of claim 1, further comprising a catch configured to engage the latch to hold the gate closed and a gate stop configured to fix the range of gate rotation, wherein the catch includes an elongate vertical aperture for receiving a catch fastener and the gate stop includes an elongate horizontal aperture for receiving a gate stop fastener, the elongate apertures allowing provisional placement of fasteners while the catch and gate stop are being mounted or adjusted.

16. The fastening device of claim 15, wherein the catch further defines circular catch apertures and the gate stop further defines circular gate stop apertures for receiving catch fasteners and gate stop fasteners, respectively, that can be installed to secure the catch and gate stop after they are in their desired positions.

17. The fastening device of claim 1, wherein the support apertures include tapered counterbores that receive heads of the support fasteners, causing an interference fit that reduces or eliminates fastener backout.

18. The fastening device of claim 15, wherein the first support is formed of plastic and the support fasteners are formed of metal.

19. The fastening device of claim 1, wherein the handle is a first handle, further comprising:

a second handle configured to attach to the spindle, wherein each of the first and second handles defines a void configured to receive an end of the spindle; and an insert configured to be cut to an appropriate length and placed into the void of one of the handles before the spindle extends into the void of the one of the handles, to limit axial travel of the spindle, allowing the gate fastening device to be installed on gates having a range of different thicknesses.

20. A method of installing the gate fastening device of claim 1, the method comprising:

mounting the latching assembly on a gate, wherein mounting the latching assembly includes attaching the first support to the gate using support fasteners received in support apertures defined by the first support;

mounting the opposing assembly on the gate opposite the first support, wherein mounting the opposing assembly includes attaching the second support to the gate using support fasteners received in support apertures defined by the second support;

coupling the latch and the pivotable member to one another through the gate for rotation as a unit, wherein coupling includes placing opposite ends of the spindle into a void of the first handle and a void of the second handle;

placing the cover onto the first support and around the base of the handle; and securing the cover to the first support by engaging complementary snap-fit features of the cover and the first support with one another.

21. The fastening device of claim 1, further comprising an insert that engages the spindle and allows the fastening device to be used on gates of different thicknesses, wherein the length of the insert can be adjusted by cutting the insert or selecting the insert from a group of inserts having different lengths.

* * * * *